(12) United States Patent
Koike

(10) Patent No.: US 12,033,490 B2
(45) Date of Patent: Jul. 9, 2024

(54) INFORMATION PROCESSING DEVICE, INFORMATION PROCESSING METHOD, AND PROGRAM

(71) Applicant: SONY GROUP CORPORATION, Tokyo (JP)

(72) Inventor: Ryusei Koike, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 203 days.

(21) Appl. No.: 17/642,487

(22) PCT Filed: Oct. 23, 2020

(86) PCT No.: PCT/JP2020/039843
§ 371 (c)(1),
(2) Date: Mar. 11, 2022

(87) PCT Pub. No.: WO2021/090702
PCT Pub. Date: May 14, 2021

(65) Prior Publication Data
US 2022/0309900 A1 Sep. 29, 2022

(30) Foreign Application Priority Data
Nov. 7, 2019 (JP) .................. 2019-202081

(51) Int. Cl.
*G08B 21/22* (2006.01)
*H04R 1/32* (2006.01)
(52) U.S. Cl.
CPC .......... *G08B 21/22* (2013.01); *H04R 1/323* (2013.01); *H04R 2499/15* (2013.01)

(58) Field of Classification Search
CPC .............................. G08B 21/22; H04R 1/323
See application file for complete search history.

(56) References Cited

U.S. PATENT DOCUMENTS

2019/0147175 A1* 5/2019 Varerkar .......... G08B 13/19686
726/26

FOREIGN PATENT DOCUMENTS

| JP | H08-251561 A | 9/1996 |
| JP | 2016-192686 A | 11/2016 |
| WO | WO 2016/159163 A1 | 10/2016 |

* cited by examiner

Primary Examiner — Olisa Anwah
(74) Attorney, Agent, or Firm — Paratus Law Group, PLLC

(57) ABSTRACT

The present technology relates to an information processing device, an information processing method, and a program capable of allowing a user viewing a video of a remote location to be aware of presence of a person who is outside of an angle of field of a video in more appropriate form.
An information processing device according to the present technology includes a processing unit, wherein, when, between a first space where a first imaging device and a first display device are installed and a second space where a second imaging device and a second display device are installed, a captured image captured by the imaging device in one of the spaces is displayed by the display device in the other space in real time, the processing unit performs processing to notify first users in the first space that second users are outside of an angle of field of the second imaging device when the second users who are at positions outside of the angle of field of the second imaging device is detected. The present technology can be applied to, for example, a video communication system.

19 Claims, 24 Drawing Sheets

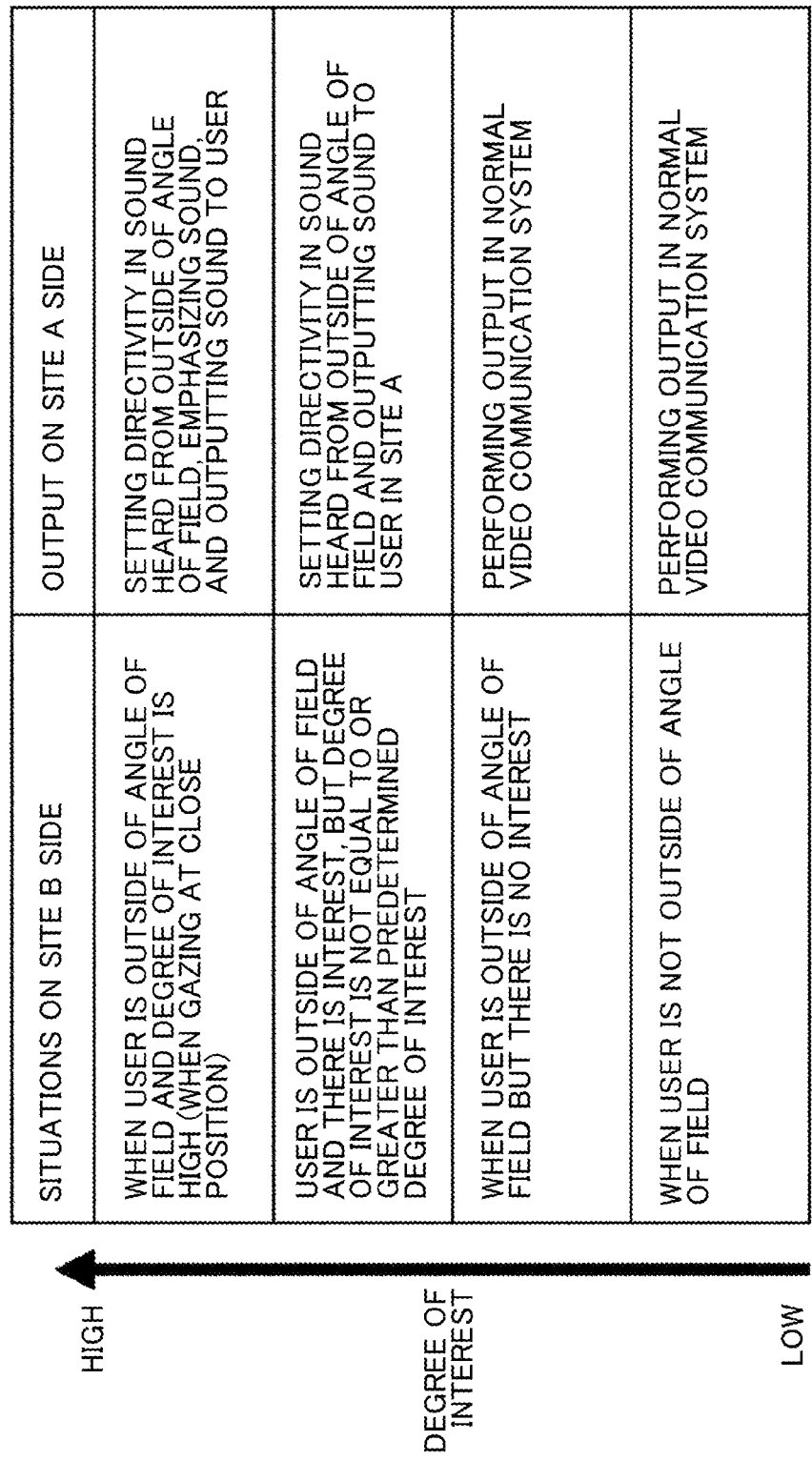

Fig. 10

| SITUATIONS ON SITE B SIDE | OUTPUT ON SITE A SIDE |
|---|---|
| WHEN USER IS OUTSIDE OF ANGLE OF FIELD AND DEGREE OF INTEREST IS HIGH (WHEN GAZING AT CLOSE POSITION) | SETTING DIRECTIVITY IN SOUND HEARD FROM OUTSIDE OF ANGLE OF FIELD, EMPHASIZING SOUND, AND OUTPUTTING SOUND TO USER |
| USER IS OUTSIDE OF ANGLE OF FIELD AND THERE IS INTEREST, BUT DEGREE OF INTEREST IS NOT EQUAL TO OR GREATER THAN PREDETERMINED DEGREE OF INTEREST | SETTING DIRECTIVITY IN SOUND HEARD FROM OUTSIDE OF ANGLE OF FIELD AND OUTPUTTING SOUND TO USER IN SITE A |
| WHEN USER IS OUTSIDE OF ANGLE OF FIELD BUT THERE IS NO INTEREST | PERFORMING OUTPUT IN NORMAL VIDEO COMMUNICATION SYSTEM |
| WHEN USER IS NOT OUTSIDE OF ANGLE OF FIELD | PERFORMING OUTPUT IN NORMAL VIDEO COMMUNICATION SYSTEM |

DEGREE OF INTEREST: HIGH → LOW

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2020/039843 (filed on Oct. 23, 2020) under 35 U.S.C. § 371, which claims priority to Japanese Patent Application No. 2019-202081 (filed on Nov. 7, 2019), which are all hereby incorporated by reference in their entirety.

TECHNICAL FIELD

The present technology relates to an information processing device, an information processing method, and a program, and more particularly, to an information processing device, an information processing method, and a program capable of allowing a user viewing a video of a remote location to be aware of the presence of people who are outside of an angle of field of the video in more appropriate form.

BACKGROUND ART

In the related art, users at remote locations can talk while viewing each other's faces with video communication systems, and thus more familiar communication can be achieved.

For example, PTL 1 discloses a video display system in which communication can be implemented in a sense of presence as if users at remote locations were actually looking at each other.

CITATION LIST

Patent Literature

[PTL 1]
JP 2016-192686 A

SUMMARY

Technical Problem

Incidentally, in the above-described video display system, users viewing scenes of remote locations through displays are sometimes unaware of people who are outside of angles of fields of cameras used to capture videos of the remote locations.

In particular, when there are a plurality of people viewing aspects of remote locations, only some users paying attention to an angle of field outside of the angle of field are preferably allowed to be aware of people outside of the angle of field.

The present technology has been devised in view of such circumstances and allows users viewing videos of remote locations to be aware of the presence of a person who is outside of an angle of field of the videos in a more appropriate form.

Solution to Problem

An information processing device according to an aspect of the present technology is an information processing device including a processing unit. Between a first space where a first imaging device and a first display device are installed and a second space where a second imaging device and a second display device are installed, when a captured image captured by the imaging device in one of the spaces is displayed by the display device in the other space in real time, the processing unit performs processing to notify first users in the first space that second users are outside of an angle of field of the second imaging device when the second users who are at positions outside of the angle of field of the second imaging device are detected.

An information processing method according to an aspect of the present technology is an information processing method of an information processing device. Between a first space where a first imaging device and a first display device are installed and a second space where a second imaging device and a second display device are installed, when a captured image captured by the imaging device in one of the spaces is displayed by the display device in the other space in real time, the information processing device performs processing to notify first users in the first space that second users are outside of an angle of field of the second imaging device when the second users who are at positions outside of the angle of field of the second imaging device are detected.

An information processing device according to still another aspect of the present technology is a program causing a computer to perform, when, between a first space where a first imaging device and a first display device are installed and a second space where a second imaging device and a second display device are installed, a captured image captured by the imaging device in one of the spaces is displayed by the display device in the other space in real time, processing to notify first users in the first space that second users are outside of an angle of field of the second imaging device when the second users who are at positions outside of the angle of field of the second imaging device are detected.

According to an aspect of the present technology, between a first space where a first imaging device and a first display device are installed and a second space where a second imaging device and a second display device are installed, when a captured image captured by the imaging device in one of the spaces is displayed by the display device in the other space in real time, processing is performed to notify first users in the first space that second users are outside of an angle of field of the second imaging device when the second users who are at positions outside of the angle of field of the second imaging device are detected.

BRIEF DESCRIPTION OF DRAWINGS

FIG. 10 is a diagram illustrating examples of combinations of situations of a B site and output methods on the site A side.

DESCRIPTION OF EMBODIMENTS

Figure 1:
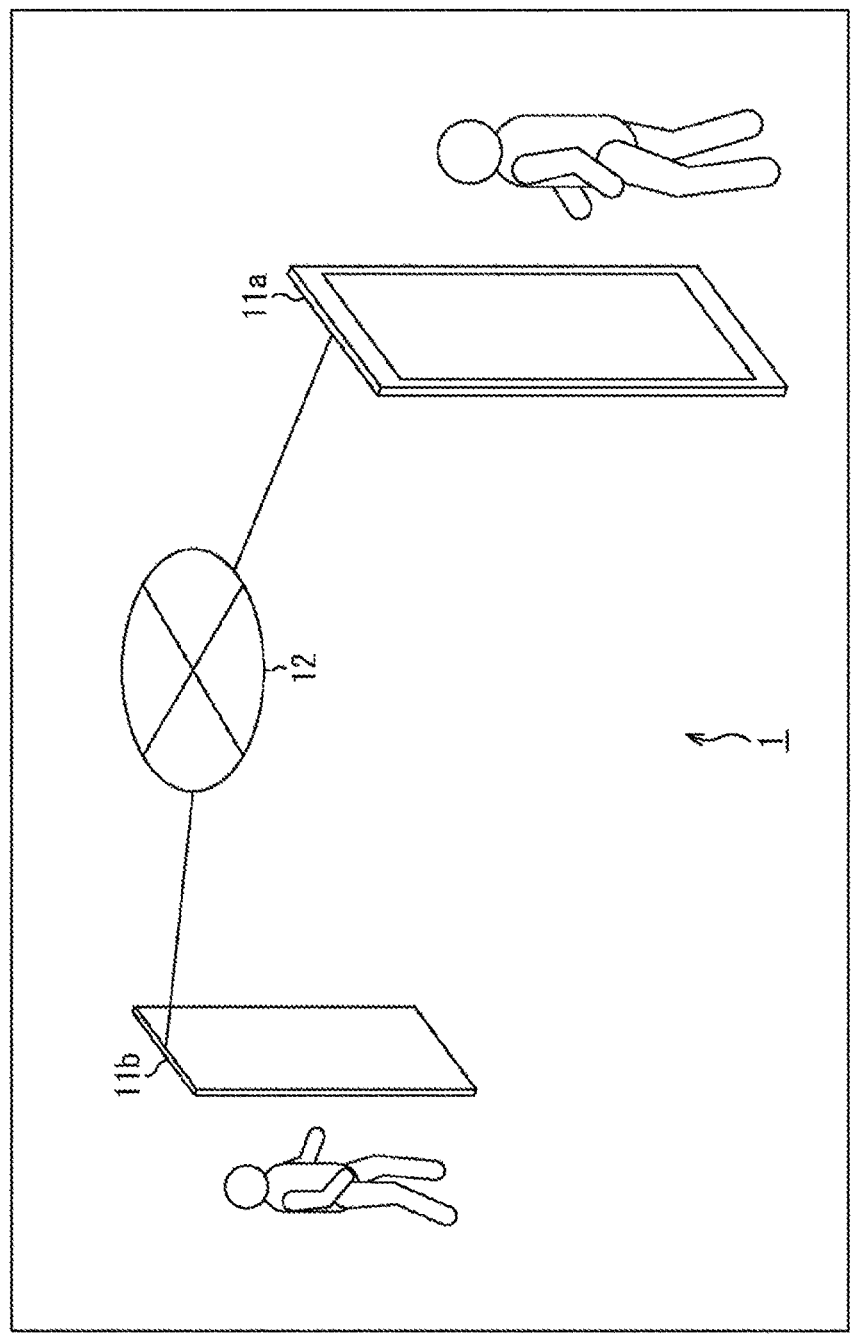
FIG. 1 is a diagram illustrating an exemplary configuration of a video communication system according to an embodiment of the present technology.

Hereinafter, modes for carrying out the present technology will be described. The description will be made in the following order.

1. Video communication system
2. First output control
3. Second output control
4. Third output control
5. Fourth output control
6. Modification examples

1. Video Communication System

FIG. 1 is a diagram illustrating an exemplary configuration of a video communication system according to an embodiment of the present technology.

As illustrated in FIG. 1, a video communication system 1 is configured such that telecommunication devices 11a and 11b which are two information processing devices are connected via a network 12 such as the Internet.

The telecommunication devices 11a and 11b are provided in different spaces such as different buildings or different rooms. A user near the telecommunication device 11a and a user near the telecommunication device 11b, as illustrated in FIG. 1, are users who are at remote locations from each other.

The telecommunication devices 11a and 11b have basically the same configuration. As will be described below in detail, in the telecommunication devices 11a and 11b, cameras that image surrounding aspects, microphones that collect surrounding sounds such as environmental sounds, speakers that output sounds, and the like are provided in addition to displays that have large sizes.

Videos captured by the cameras, sounds collected by the microphones, and the like are transmitted and received, for example, regularly in real time between the telecommunication devices 11a and 11b while connection of both sides is established.

The telecommunication device 11a displays videos captured by the telecommunication device 11b and outputs sounds collected by the telecommunication device 11b.

In the videos captured by the telecommunication device 11b, an aspect of a space where the telecommunication device 11b is installed is shown, including an aspect of the user of the telecommunication device 11b. Sounds collected by the telecommunication device 11b include environmental sounds of the space where the telecommunication device 11b is installed in addition to sounds of the user of the telecommunication device 11b.

Thus, for example, the user of the telecommunication device 11a faces the far side of the telecommunication device 11a near the user and feels as if the user of the telecommunication device 11b is present.

Similarly, the telecommunication device 11b displays videos captured by the telecommunication device 11a and outputs sounds collected by the telecommunication device 11a.

In the videos captured by the telecommunication device 11a, an aspect of a space where the telecommunication device 11a is installed is shown, including an aspect of the user of the telecommunication device 11a. Sounds collected by the telecommunication device 11a include environmental sounds of the space where the telecommunication device 11a is installed in addition to sounds of the user of the telecommunication device 11a.

Thus, for example, the user of the telecommunication device 11b faces the far side of the telecommunication device 11b near the user and feels as if the user of the telecommunication device 11a is present.

The user of the telecommunication device 11a can achieve natural communication with the user of the telecommunication device 11b as if the user of the telecommunication device 11b is present in an adjacent space.

Similarly, the user of the telecommunication device 11b can achieve natural communication with the user of the telecommunication device 11a as if the user of the telecommunication device 11a is present in an adjacent space.

That is, the users of the telecommunication devices 11a and 11b can achieve smoother communication while feeling close to each other by communicating without active awareness.

Hereinafter, when it is not necessary to distinguish the telecommunication devices 11a and 11b from each other, the telecommunication devices 11a and 11b are collectively referred to as the telecommunication devices 11. The same applies to other paired configurations in this description.

Figure 2:
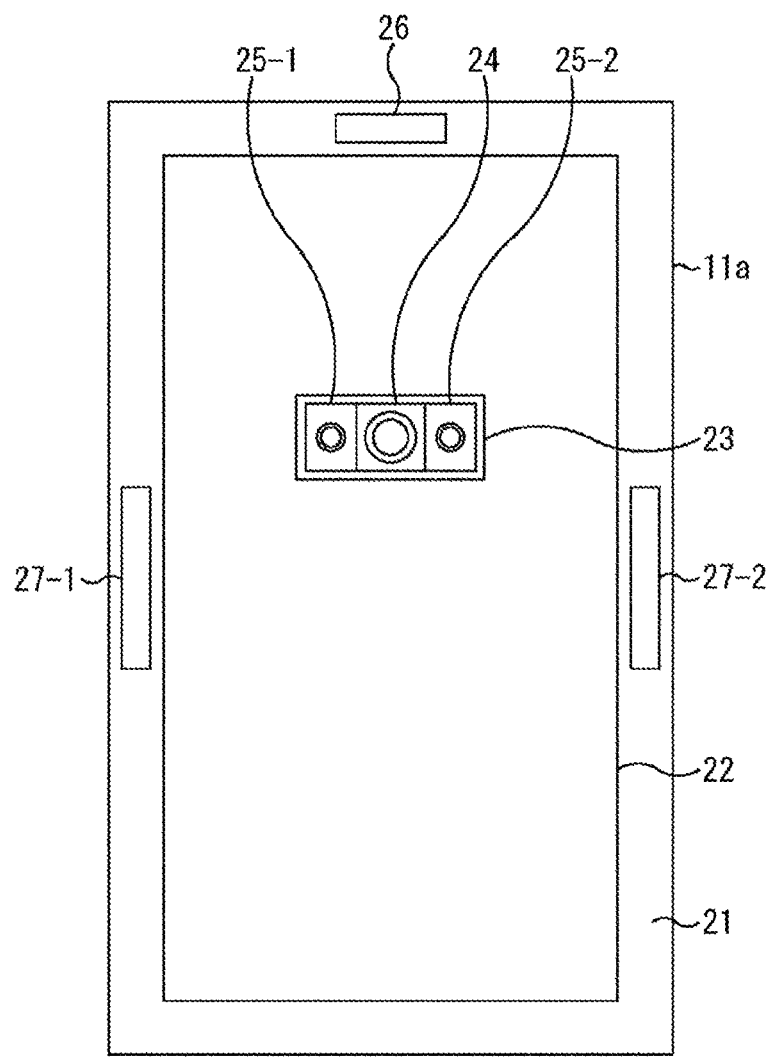
FIG. 2 is a front view illustrating an exemplary configuration of the exterior of a telecommunication device.

FIG. 2 is a front view illustrating an exemplary configuration of the exterior of the telecommunication device 11a.

As illustrated in FIG. 2, a narrow frame 21 remains on the front surface of the casing of the telecommunication device 11a and a longitudinally long rectangular display 22 configured as a liquid crystal display (LCD), an organic electro luminescence (EL) display, or the like is provided.

A sensor unit 23 is provided via an instruction member (not illustrated) fixed to, for example, the frame 21 in the front of the display 22. The sensor unit 23 is provided with a camera 24 and sensors 25-1 and 25-2 which are two sensors.

Of the upper, lower, left, and right edges of the frame 21, a microphone 26 is provided on the upper edge, and speakers 27-1 and 27-2 are provided on the left and right edges.

The display 22 displays a video in accordance with captured images captured by the telecommunication device 11b based on video information transmitted from the telecommunication device 11b.

The camera 24 images a space in front of the telecommunication device 11a. The video information indicating a video in accordance with captured images captured by the camera 24 is transmitted to the telecommunication device 11b.

The sensors 25-1 and 25-2 are configured by various types of sensors such as cameras or infrared sensors. The sensors 25-1 and 25-2 generate environmental information based on detection results of the sensors.

The environmental information is information including videos in accordance with captured images captured by the cameras include in the sensors 25 and information acquired by infrared sensors. In the video in accordance with the captured images captured by the camera included in the sensor 25, an aspect outside of the angle of camera field, which is a range outside of an angle of imaging field of the camera 24, is also shown.

The environmental information including information outside of the angle of camera field is transmitted to the telecommunication device 11b. In the telecommunication device 11b, for example, a sound heard from outside of the angle of camera field (a sound for which a position outside of the angle of camera field is a sound source position) is analyzed based on the environmental information.

The microphone 26 collects a sound of the space where the telecommunication device 11a is installed. Sound information indicating the sound collected by the microphone 26 is transmitted to the telecommunication device 11b.

The speakers 27-1 and 27-2 output the sound of the space where the telecommunication device 11b is installed based on the sound information transmitted from the telecommunication device 11b.

The telecommunication device 11b has the same configuration as the telecommunication device 11a illustrated in FIG. 2. Hereinafter, the configuration of the telecommunication device 11a illustrated in FIG. 2 is used as the configuration of the telecommunication device 11b in this description.

The positions at which the camera 24, the sensors 25-1 and 25-2, the microphone 26, and the speakers 27-1 and 27-2 are installed in FIG. 2 are exemplary, and may be other positions as long as the functions can be implemented, and the numbers of installed sensors, microphones, and speakers are arbitrary.

Figure 3:
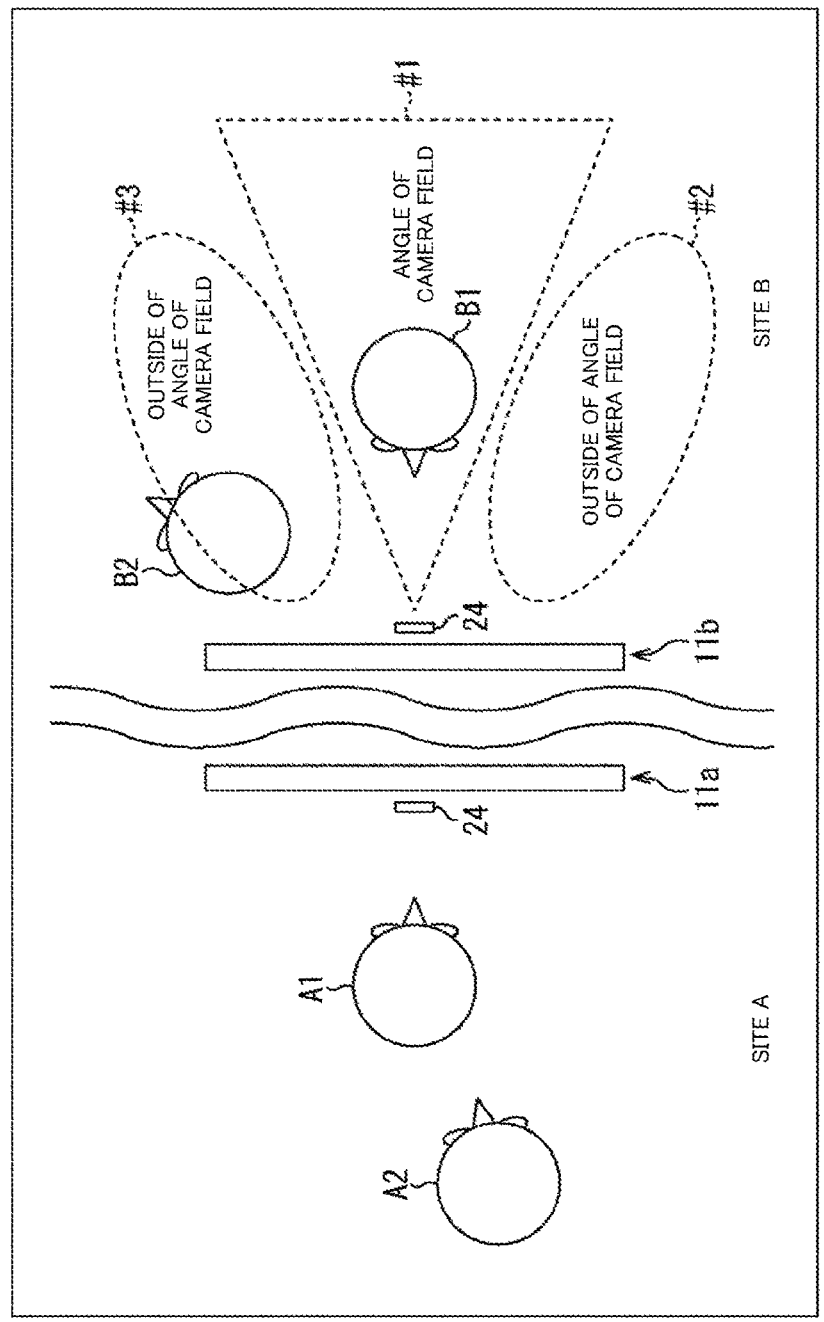
FIG. 3 is a diagram illustrating an example of a situation in which the telecommunication devices are used.

FIG. 3 is a diagram illustrating an example of a situation in which the telecommunication devices 11 are used.

As illustrated in FIG. 3, for example, the telecommunication devices 11a and 11b are installed at sites A and B which are mutually distant spaces. A wave line illustrated in the middle of FIG. 3 indicates that the space where the telecommunication device 11a is installed is away from the space where the telecommunication device 11b is installed.

In the example of FIG. 3, at the site A, it is assumed that users A1 and A2 who are two users are in front of the telecommunication device 11a. For example, the user A1 is a user who views a video displayed on the telecommunication device 11a and talks with a user B1 who is at the site B. The user A2 is a user who views the telecommunication device 11a from the rear position of the user A1.

At the site B, on the other hand, it is assumed that users B1 and B2 who are two users are in front of the telecommunication device 11b. For example, the user B1 is a user who views a video displayed on the telecommunication device 11b and talks with the user A1 who is at the site A. The user B2 is a user who is performing work outside of an angle of camera field.

Range #1 indicated by a dotted line as a range of the site B is a range of an angle of camera field of the telecommunication device 11b (the camera 24 installed in the telecommunication device 11b). Ranges #2 and #3 indicated by dotted lines are ranges outside of the angle of camera field of the telecommunication device 11b (the camera 24 installed in the telecommunication device 11b).

In this way, the telecommunication devices 11a and 11b are used in a situation in which there are a plurality of users around in some cases. Outputs of the telecommunication devices 11a and 11b are controlled in accordance with actions of the surrounding users.

2. First Output Control

Overview of Output Control

Figure 4:
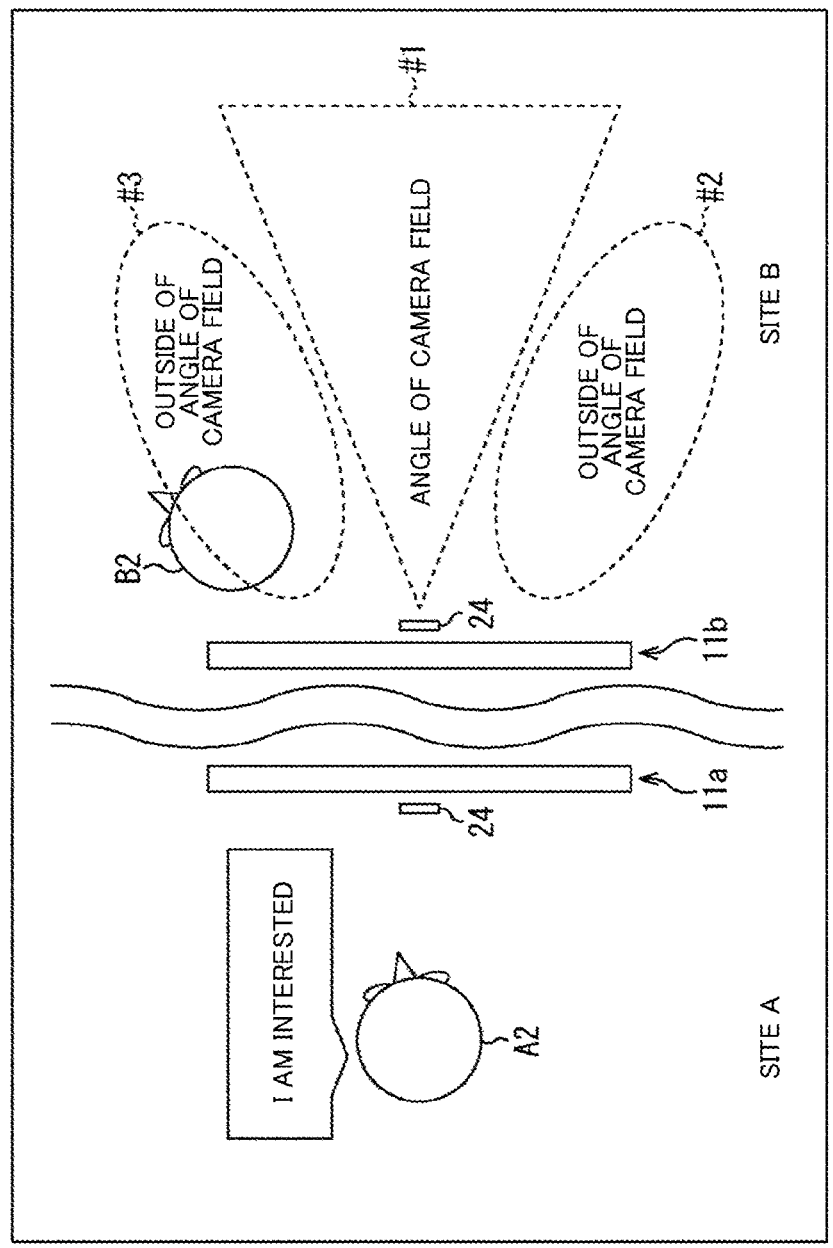
FIG. 4 is a diagram illustrating an overview of first output control of the telecommunication device.

FIG. 4 is a diagram illustrating an overview of first output control of the telecommunication device 11.

In the example of FIG. 4, it is assumed that only the user A2 is in front of the telecommunication device 11a at the site A. At the site B, on the other hand, it is assumed that there is only the user B2. The user B2 is a user who is within range #3 which is a range outside of the angle of camera field.

At this time, since there is nothing within range #1 which is a range of the angle of camera field of the telecommunication device 11b, nothing is shown in a video displayed on the telecommunication device 11a. The user A2 in front of the telecommunication device 11a is assumed to be interested in the person outside of the angle of camera field and to perform action of looking to see whether somebody is there, as indicated by a balloon of FIG. 4.

In such a situation, when it is detected that the user A2 is performing an action of interest, the telecommunication device 11a outputs an emphasized indication sound toward the user A2. The indication sound is a sound heard from outside of the angle of camera field so that the user A2 feels an indication of a person outside of the angle of camera field of the telecommunication device 11b.

The action of interest is an action of the user who is paying attention to the person outside of the angle of camera field. The action of a user who is paying attention to the angle of field outside of the angle of camera field includes an action indicating interest in any of the left and right ends of the display 22 of the telecommunication device 11a and an action of paying attention to the person outside of the angle of camera field and looking into the telecommunication device 11a.

The output of the indication sound is controlled in accordance with magnitude of the degree of interest of the user A2 in the person outside of the angle of camera field. The telecommunication device 11a analyzes the magnitude of the degree of interest based on the action of interest of the user A2 and controls an output method or the like for an indication sound in accordance with the magnitude of the degree of interest.

Figure 5:
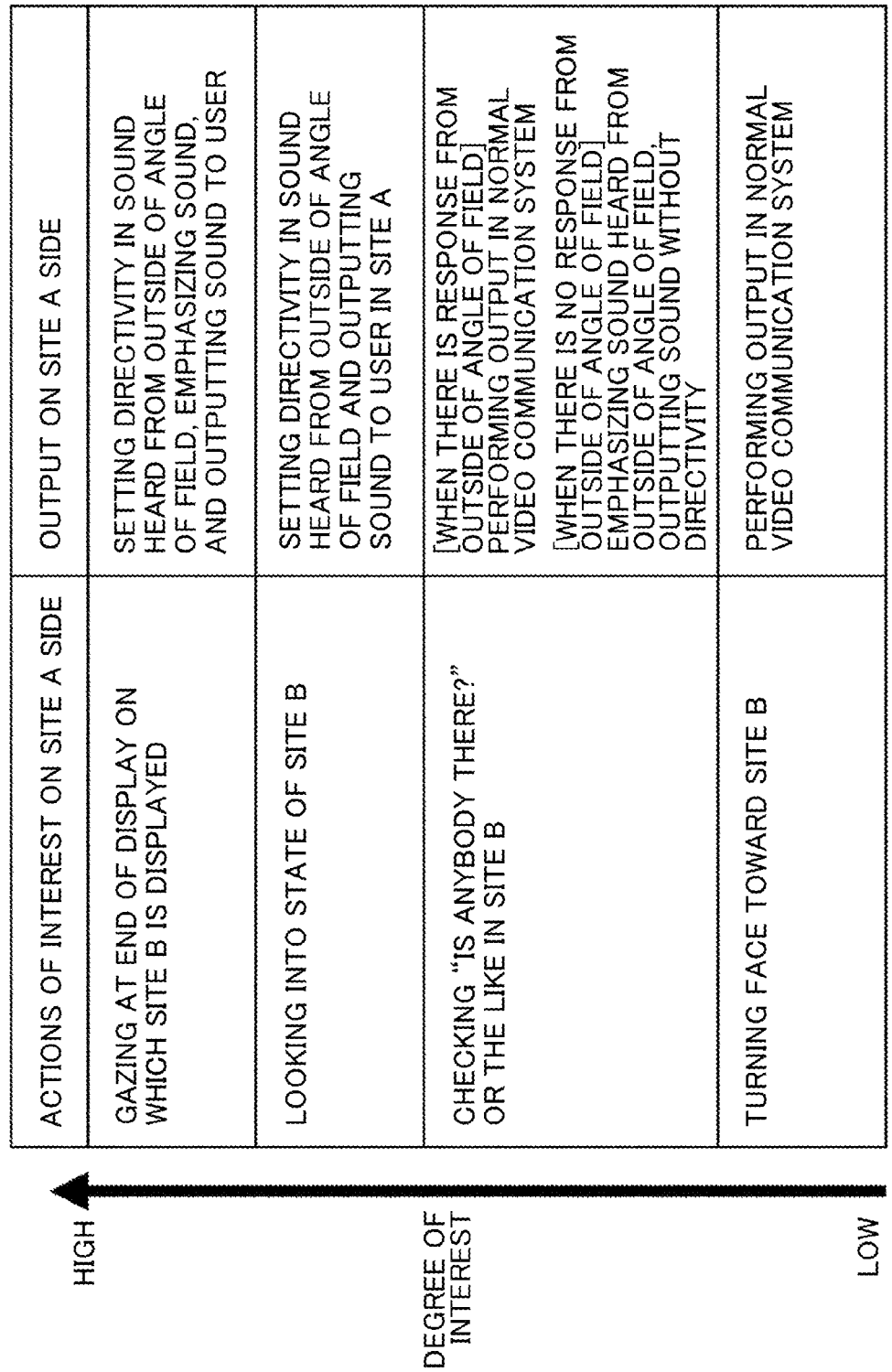
FIG. 5 is a diagram illustrating an example of a combination of the degree of interest of a user and output methods on a site A side.

FIG. 5 is a diagram illustrating an example of a combination of the degree of interest of the user A2 and output methods on a site A side.

In the example of FIG. 5, in descending order of the degree of interest, an action of gazing at an end of the display 22 on which a video of the site B is displayed, an action of looking into an aspect of the site B, an action of checking whether there is a person outside of the angle of camera field at the site B by saying "Is anybody there?", or an action of turning a face toward the site B are shown as actions of interest of the user A2.

As shown in the second row of the lower column of the item in the first row of the table of FIG. 5, when the user A2 performs an action of interest of gazing at the end of the display 22 on which the video of the site B is displayed, the telecommunication device 11a adjusts directivity of the speakers 27-1 and 27-2 and outputs an emphasized indication sound toward the user A2. At this time, the telecommunication device 11a adjusts the directivity of the speakers 27-1 and 27-2 toward the user A2 and performs processing for raising a volume of the indication sound.

As illustrated in the third row of the table of FIG. 5, when the user A2 performs an action of interest of looking into the aspect of the site B, the telecommunication device 11a adjusts the directivity of the speakers 27-1 and 27-2 and outputs the indication sound toward the user A2. At this time, the telecommunication device 11a performs processing for adjusting the directivity of the speakers 27-1 and 27-2 toward the user A2.

As illustrated in the fourth row of the table of FIG. 5, when the user A2 performs an action of interest of checking whether there is a person outside of the angle of camera field in the B site by saying "Is anybody there?", the telecommunication device 11a outputs the indication sound through an output method in response to presence or absence of a response to the speech of the user A2.

For example, when the user B2 responds, the telecommunication device 11a performs an output in a normal video communication system. As the output in the normal video communication system, for example, the telecommunication device 11a performs processing for outputting an environmental sound collected at the site B rather than the indication sound heard from outside of the angle of camera field.

Conversely, when the user B2 does not respond, the telecommunication device 11a outputs the emphasized indication sound toward the whole site A. At this time, the telecommunication device 11a performs processing for raising a volume of the indication sound.

As illustrated in the fifth row of the table of FIG. 5, when the user A2 views the display of the telecommunication device 11a and performs the action of interest of turning the face to the site B, the telecommunication device 11a performs an output in the normal video communication system.

In this way, as the degree of interest of the action of interest of the user A2 is higher, the indication sound heard from outside of the angle of camera field is output toward the user A2 in a more emphasized form.

Thus, the user A2 can be aware of a person who is outside of the angle of camera field of the telecommunication device 11b (the camera 24 installed in the telecommunication device 11b) of the connection destination by the indication sound output from the telecommunication device 11a.

Since the indication sound is output toward the user A2 performing the action of interest, the telecommunication device 11a can allow only the user A2 paying attention to the angle of camera field outside of the angle of camera field of the connection destination to be aware of presence of the person who is outside of the angle of camera field.

For example, as in the user A1 of FIG. 3, the indication sound is not output to the user A1 talking with the user B1 who is not paying attention to the angle of field outside of the angle of camera field of the connection destination. The user A1 can continue to talk with the user B1 without paying attention to the person outside of the angle of camera field.

In this way, since the indication sound is presented to only the user who is paying attention to the person outside of the angle of camera field, the user can be aware of the presence of the person outside of the angle of camera field in a more appropriate form.

Configuration of Telecommunication Device 11

Figure 6:
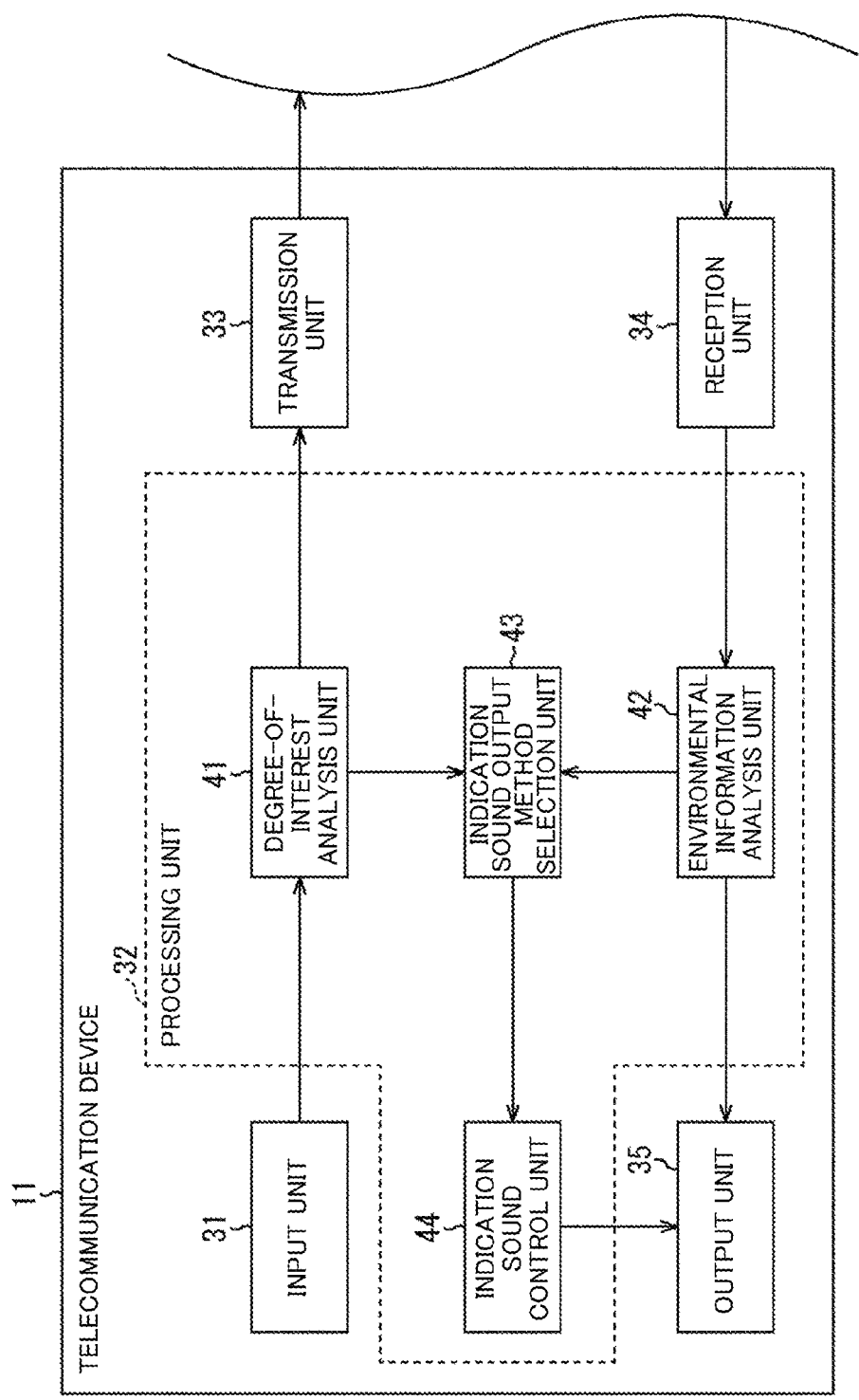
FIG. 6 is a block diagram illustrating a first exemplary configuration of the telecommunication device.

FIG. 6 is a block diagram illustrating a first exemplary configuration of the telecommunication device 11.

As illustrated in FIG. 6, the telecommunication device 11 includes an input unit 31, a processing unit 32, a transmission unit 33, a reception unit 34, and an output unit 35.

The input unit 31 is configured by an imaging device such as the camera 24, a sensing device such as the sensors 25-1 and 25-2, or a sound collection device such as the microphone 26 in FIG. 2. For example, the input unit 31 supplies the processing unit 32 with video information of a space in accordance with a captured image captured by the camera 24, environmental information generated by the sensors 25-1 and 25-2, and sound information of an environmental sound collected by the microphone 26.

A microphone collecting sounds outside of the angle of camera field and a depth sensor or the like measuring a distance to a subject imaged by the camera 24 may be included as the sensors 25-1 and 25-2 in the input unit 31. In this case, the environmental information can also include a detection result by the microphone or the depth sensor.

The processing unit 32 is configured by a central processing unit (CPU), a read-only memory (ROM), a random access memory (RAM), or the like. The processing unit 32 controls an operation of the whole telecommunication device 11 by executing a predetermined program.

As illustrated in FIG. 6, the processing unit 32 includes a degree-of-interest analysis unit 41, an environmental information analysis unit 42, an indication sound output method selection unit 43, and an indication sound control unit 44.

The degree-of-interest analysis unit 41 supplies the transmission unit 33 with the video information, the environmental information, and the sound information of the environmental sound supplied from the input unit 31.

The degree-of-interest analysis unit 41 analyzes the degree of interest of a user in front of the telecommunication device 11 in the person outside of the angle of camera field of the connection destination based on the video information, the environmental information, and the sound information of the environmental sound supplied from the input unit 31.

For example, the degree-of-interest analysis unit 41 analyzes magnitude of the degree of interest of the user based on a position at which the user in front of the telecommunication device 11 is gazing, a length of a time in which a visual line is oriented to the display 22, a spoken sound, and an orientation of the head of a user. As a method of analyzing the degree of interest in the person outside of the angle of camera field of the connection destination, any of various methods can be used.

Degree-of-interest information which is information indicating the degree of interest of the user analyzed by the degree-of-interest analysis unit 41 is supplied to the indication sound output method selection unit 43.

The environmental information analysis unit 42 supplies the output unit 35 with the video information and the sound information of the environmental sound of the connection destination supplied from the reception unit 34.

The environmental information analysis unit 42 analyzes a sound heard from outside of the angle of camera field and a sound heard from within the angle of camera field which are included in the environmental sound of the connection destination based on the environmental information of the connection destination supplied from the reception unit 34. The sound heard from outside of the angle of camera field is used as an indication sound which is appropriately presented to the user.

The environmental information analysis unit 42 that analyzes a sound heard from outside of the angle of camera field and a sound heard from within the angle of camera field also detects a user who is outside of the angle of camera field of the connection destination.

Specifically, the environmental information analysis unit 42 detects a user who is outside of the angle of camera field by performing bone estimation using a video in which an aspect outside of the angle of camera field of the connection destination is shown. The bone estimation is a technology for estimating a skeleton of a person using a captured image. A user who is outside of the angel of camera field of the connection destination may be detected by performing detection of a background difference and face recognition using a video in which the aspect outside of the angle of camera field is shown.

The video in which the aspect outside of the angle of camera field of the connection destination is shown and which is used to detect the user who is outside of the angle of camera field is information included in the environmental information of the connection destination.

Information indicating an analysis result by the environmental information analysis unit 42 is supplied to the indication sound output method selection unit 43 along with the sound information of the environmental sound of the connection destination.

The indication sound output method selection unit 43 selects a method of outputting the indication sound based on the information supplied from the environmental information analysis unit 42 and the degree-of-interest information supplied from the degree-of-interest analysis unit 41. For example, the indication sound output method selection unit 43 selects magnitude of a volume of the indication sound or directivity of the speakers 27-1 and 27-2 outputting the indication sound.

The indication sound control unit 44 is supplied with the sound information of the environmental sound of the connection destination, the information indicating the result of the analysis by the environmental information analysis unit 42, and the information indicating the output method for the indication sound.

The indication sound control unit 44 generates the sound information of the indication sound by processing the sound information of the environmental sound of the connection destination based on the information supplied from the indication sound output method selection unit 43. For example, the indication sound control unit 44 generates the sound information of the indication sound by extracting the sound information of the indication sound heard from outside of the angle of camera field of the connection destination from the sound information of the environmental sound of the connection destination.

The indication sound control unit 44 supplies the sound information of the indication sound to the output unit 35 and causes the indication sound to be output by the output method selected by the indication sound output method selection unit 43.

The transmission unit 33 transmits the video information, the environmental information, and the sound information of the environmental sound supplied from the processing unit 32 to the telecommunication device 11 of the connection destination via the network 12.

The reception unit 34 receives the video information, the environmental information, and the sound information of the environmental sound of the connection destination transmitted from the telecommunication device 11 of the connection destination via the network 12 and supplies the received information to the environmental information analysis unit 42.

The transmission unit 33 and the reception unit 34 are configured by a communication module or the like corresponding to wireless or wired communication such as a wireless local area network (LAN) or cellular communication (for example, LTE-Advanced or 5G).

The output unit 35 is configured by, for example, a sound output device such as a display device such as the display 22 and a sound output device such as the speakers 27-1 and 27-2 in FIG. 2. The video information and the sound information of the environmental sound of the connection destination are supplied from the environmental information analysis unit 42 to the output unit 35. The sound information of the indication sound is supplied from the indication sound control unit 44 to the output unit 35.

Based on the video information of the connection destination, the output unit 35 causes the display 22 to display a video of the space where the telecommunication device 11 of the connection destination is installed. Based on the sound information of the environmental sound of the connection destination, the output unit 35 outputs the environmental sound of the space where the telecommunication device 11 of the connection destination is installed from the speakers 27-1 and 27-2. Further, the output unit 35 outputs the indication sound from the speakers 27-1 and 27-2 under the control of the indication sound control unit 44.

The configuration of the telecommunication device 11 illustrated in FIG. 6 is exemplary and another configuration may be used. For example, a storage unit or the like serving as an auxiliary storage device configured by a semiconductor memory, a hard disk drive (HDD), or the like may be provided. In the output unit 35, a display device such as a projector may be used instead of the display 22, or a sound output device such as an earphone connected in a wired or wireless manner may be used instead of the speakers 27-1 and 27-2.

The indication sound control unit 44 may perform notification to the user using another scheme without being limited to the indication sound. That is, apart from the indication sound (sound), a scheme of causing an illuminant such as a light emitting diode (LED) to emit light, causing the display 22 to display a graphical user interface (GUI), or performing wireless communication with a device carried by the user and causing the device to vibrate can also be used. A plurality of schemes may be used in combination. In this way, the indication sound control unit 44 controls the output unit 35 that has various output functions, so to speak, as an output control unit such that the user is notified.

Operation of Telecommunication Device 11

Here, an operation of the telecommunication device 11 that has the foregoing configuration will be described with reference to the flowchart of FIG. 7.

Figure 7:
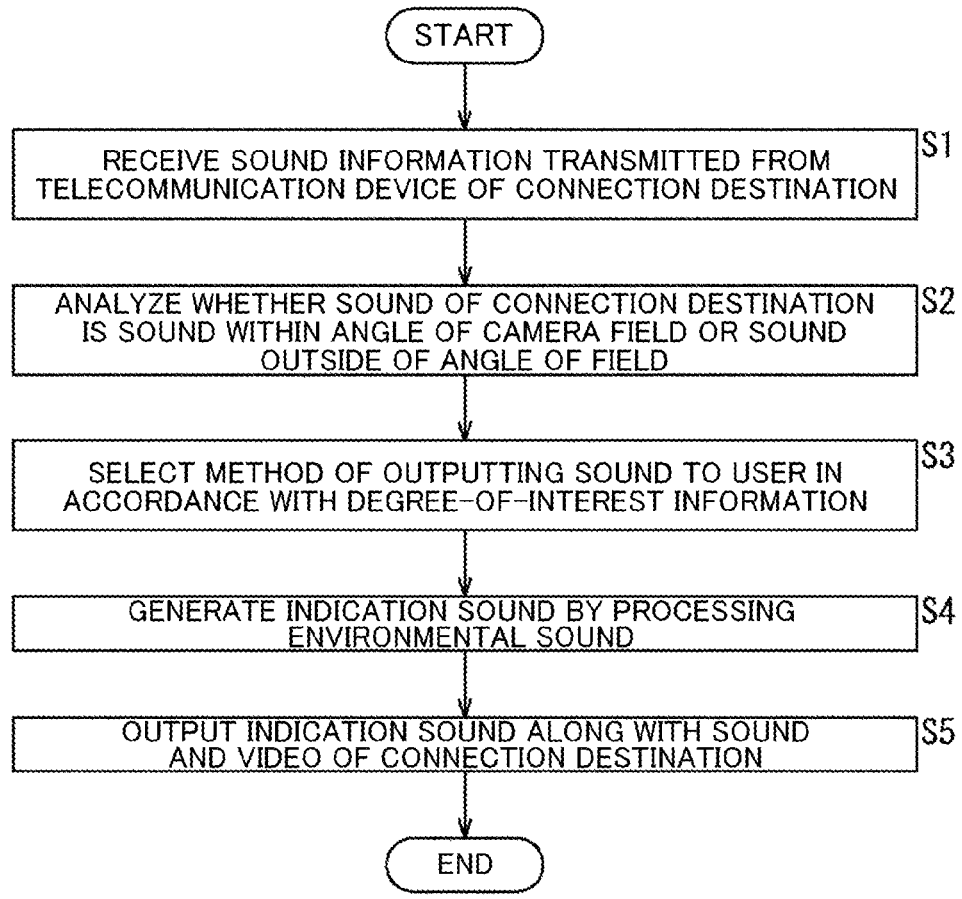
FIG. 7 is a flowchart illustrating an operation of the telecommunication device.

Processing to be described with reference to FIG. 7 is started, for example, when the video information and the sound information of the environmental sound are transmitted from the telecommunication device 11 of the connection destination via the network 12.

Processing of the degree-of-interest analysis unit 41 that analyzes the degree of interest of the user outside of the angle of camera field of the connection destination is appropriately performed in parallel to the processing of FIG. 7. The transmission unit 33 transmits the video information, the environmental information, and the sound information of the environmental sound acquired by the input unit 31 to the telecommunication device 11 of the connection destination via the network 12.

In step S1, the reception unit 34 receives the video information, the environmental information, and the sound information of the environmental sound of the connection destination transmitted from the telecommunication device 11 of the connection destination.

In step S2, the environmental information analysis unit 42 analyzes the sound heard from within the angle of camera field and the sound heard from outside of the angle of camera field, which are included in the environmental sound of the connection destination, based on the environmental information of the connection destination.

In step S3, the indication sound output method selection unit 43 selects an output method for the indication sound in accordance with the degree-of-interest information analyzed by the degree-of-interest analysis unit 41.

In step S4, the indication sound control unit 44 generates the sound information of the indication sound by processing the sound information of the environmental sound of the connection destination. As described above, the generation of the sound information of the indication sound is processing performed when there is a user who performs an action of interest of paying attention to the person outside of the angle of camera field.

In step S5, the indication sound control unit 44 causes the output unit 35 to output the indication sound by the output method selected by the indication sound output method selection unit 43 along with the environmental sound and the video of the connection destination.

Through the foregoing processing, the telecommunication device 11 causes only the user paying attention to the person outside of the angle of camera field of the connection destination to be aware of presence of a person outside of the angle of camera field of the connection destination.

The user of the telecommunication device 11 can receive a notification of information indicating presence of a person outside of the angle of camera field of the connection destination when the user performs an action of being interested in the person outside of the angle of camera field of the connection destination.

3. Second Output Control

Overview of Output Control

Figure 8:
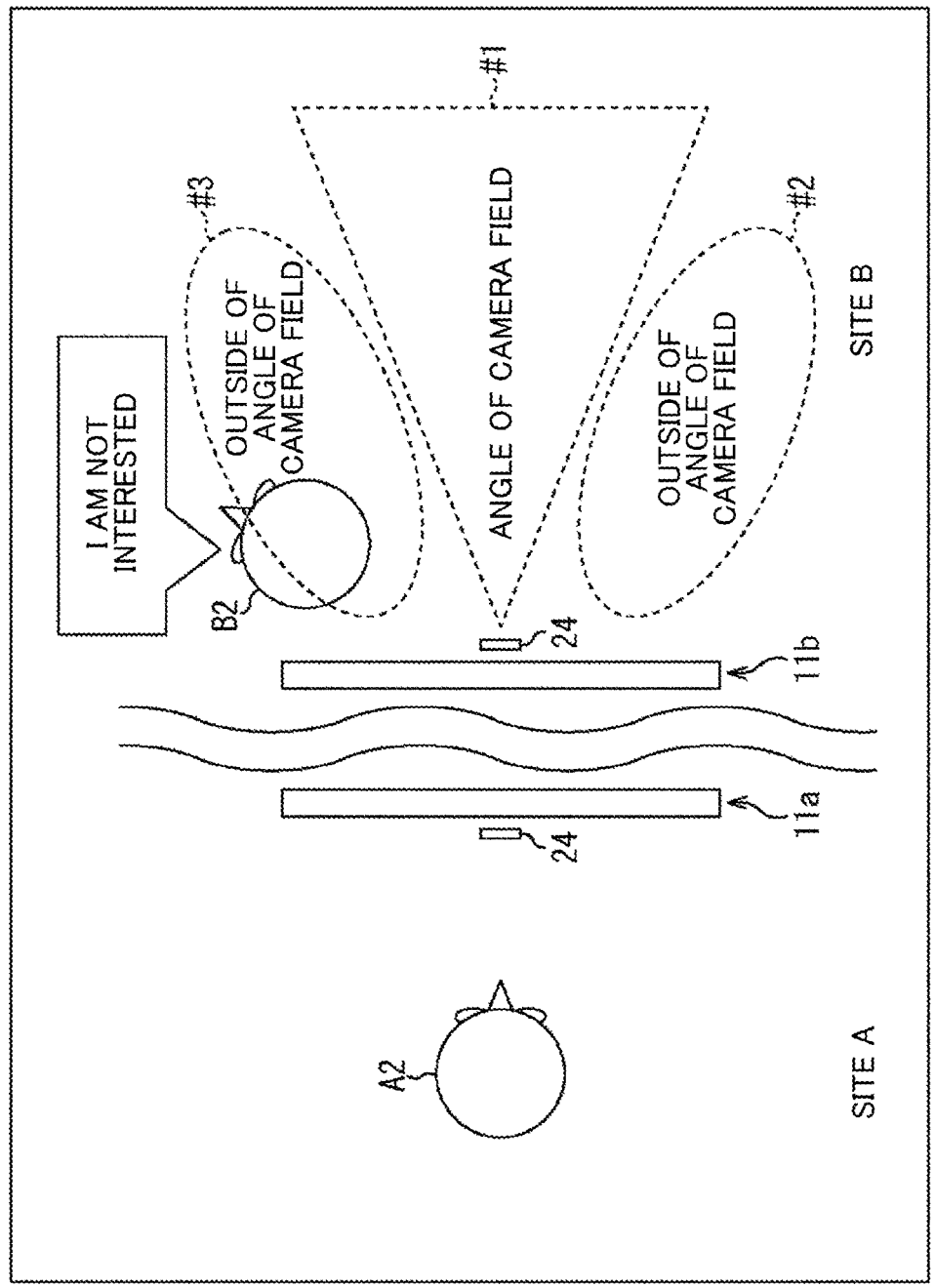
FIG. 8 is a diagram illustrating an overview of second output control of the telecommunication device.
Figure 9:
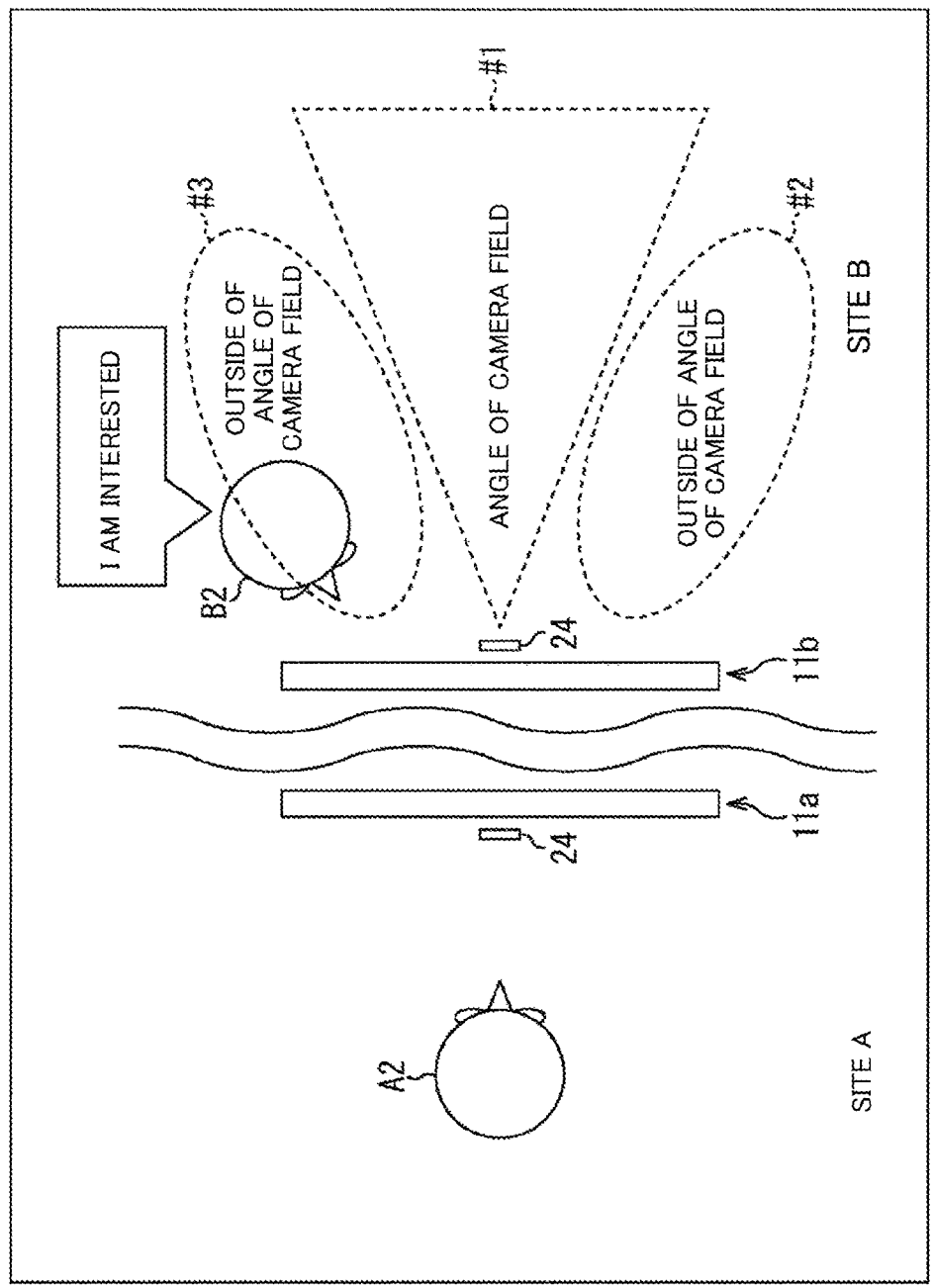
FIG. 9 is a diagram illustrating an overview of second output control of the telecommunication device.

FIGS. 8 and 9 are diagrams illustrating an overview of second output control of the telecommunication device 11.

In this example, output of the indication sound is controlled in accordance with the degree of interest of the user outside of the angle of camera field of the connection destination rather than the degree of interest of the user viewing the video of the connection destination.

In the example of FIG. 8, the user A2 is in front of the telecommunication device 11a of the site A as in the case described with reference to FIG. 4. On the other hand, it is assumed that the user B2 is within range #3 of the site B. As indicated by a balloon of FIG. 8, the user B2 is not interested in the video of the site A.

In this way, when the user B2 who is a user outside of the angle of camera field is not interested in the video of the site A, the telecommunication device 11a performs an output in a normal video communication system.

As indicated by the balloon of FIG. 9, when the user B2 is interested in the video of the site A, the telecommunication device 11a outputs the emphasized indication sound toward the user A2 interesting the user B2.

FIG. 10 is a diagram illustrating examples of combinations of situations of a B site and output method on the site A side.

In the example of FIG. 10, in a descending order of the degree of interest of the user B2, a situation in which the user B2 is outside of the angle of camera field and the degree of interest of the user B2 is high, a situation in which the user B2 is outside of the angle of camera field and the degree of interest of the user B2 is less than a predetermined degree of interest despite being an interest, a situation in which the user B2 is outside of the angle of camera field but there is no interest, and a situation in which the user B2 is not outside of the angle of camera field are shown as situations of the site B.

As shown in the second row of the lower column of the item in the first row of the table of FIG. 10, when the situation of the site B is a situation in which the user B2 is outside of the angle of camera field and the degree of interest of the user B2 is high, the telecommunication device 11a adjusts directivity of the speakers 27-1 and 27-2 and outputs an emphasized indication sound toward the user A2.

When the user B2 gazes at the user A2 near the telecommunication device 11b, the visual line is oriented to the user A2 for a predetermined time or more, the visual line is oriented a predetermined number of times or more, or the like, the telecommunication device 11a determines that the degree of interest of the user B2 is high.

As illustrated in the third row of the table of FIG. 10, when the situation of the site B is a situation in which the user B2 is outside of the angle of camera field and pays attention to the user A2, but the degree of interest is less than a threshold, the telecommunication device 11a adjusts the directivity of the speakers 27-1 and 27-2 and outputs the indication sound toward the user A2.

As illustrated in the fourth row of the table of FIG. 10, when the situation of the site B is a situation in which the user B2 is outside of the angle of camera field but is not interested in the video of the site A, the telecommunication device 11a performs an output in a normal video communication system.

As illustrated in the fifth row of the table of FIG. 10, when the situation of the site B is a situation in which the user is not outside of the angle of camera field, the telecommunication device 11a performs an output in the normal video communication system.

In this way, as the degree of interest of the user B2 is higher, the indication sound heard from outside of the angle of camera field is output toward the user A2 in a more emphasized form.

Thus, the user A2 can be aware of a person who is interested in the user A2 herself or himself outside of the angle of camera field of the telecommunication device 11b (the camera 24 installed in the telecommunication device 11b) of the connection destination by the indication sound output from the telecommunication device 11a.

Configuration of Telecommunication Device 11

Figure 11:
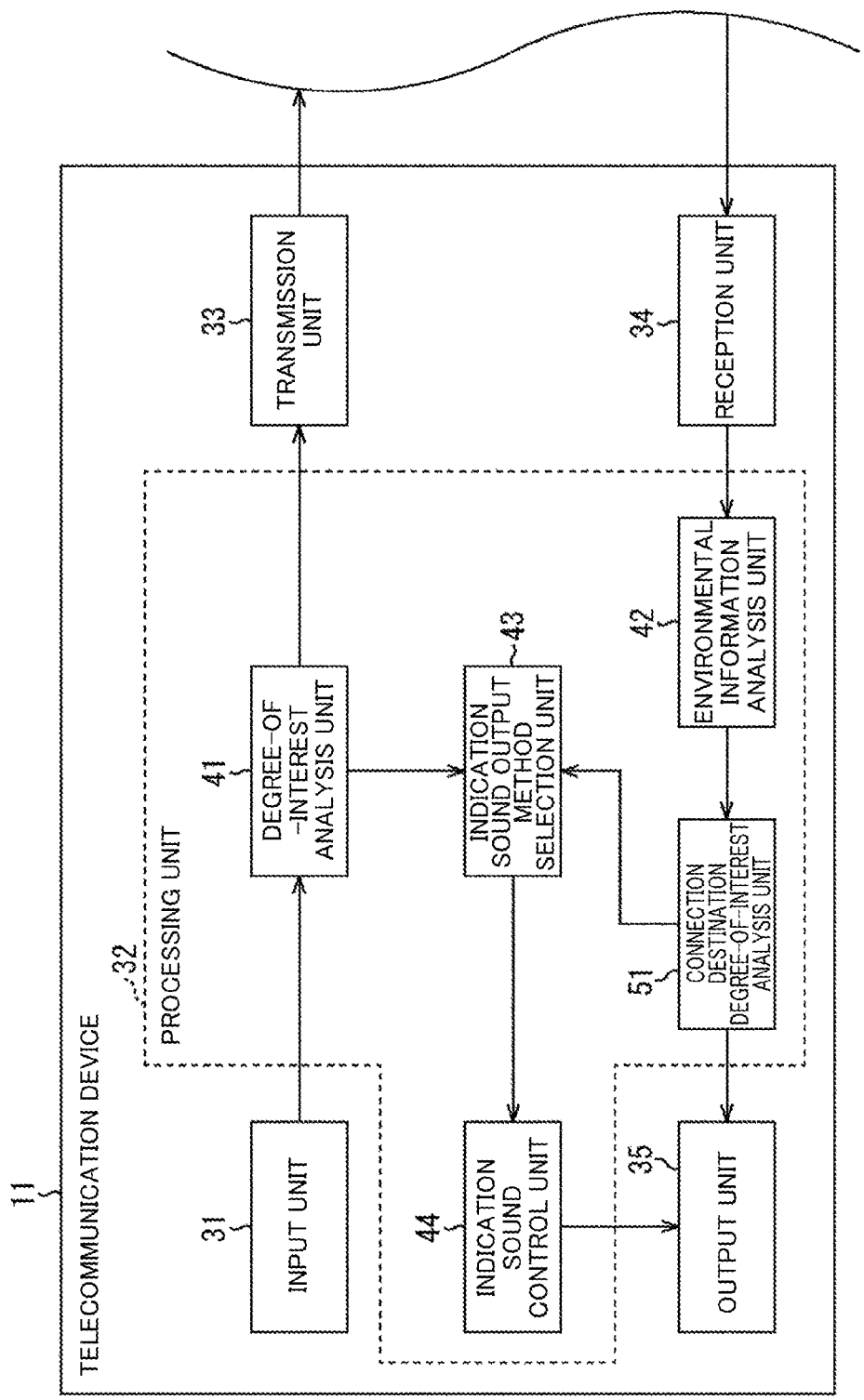
FIG. 11 is a block diagram illustrating a second exemplary configuration of the telecommunication device.

FIG. 11 is a block diagram illustrating a second exemplary configuration of the telecommunication device 11.

In FIG. 11, the same reference numerals are given to the same configurations as the configurations of the telecommunication device 11 of FIG. 6. The repeated description will be appropriately omitted. The same applies to FIG. 16 to be described below.

The configuration of the processing unit 32 illustrated in FIG. 11 is different from the configuration described with reference to FIG. 6 in that a connection destination degree-of-interest analysis unit 51 is provided at the rear stage of the environmental information analysis unit 42.

The information indicating the analysis result by the environmental information analysis unit 42, the video information, the environmental information, and the sound information of the environmental sound of the connection destination are supplied from the environmental information analysis unit 42 to the connection destination degree-of-interest analysis unit 51.

The connection destination degree-of-interest analysis unit 51 supplies the output unit 35 with the video information and the sound information of the environmental sound of the connection destination supplied from the environmental information analysis unit 42.

The connection destination degree-of-interest analysis unit 51 analyzes the degree of interest of the user outside of the angle of camera field of the connection destination based on the environmental information of the connection destination supplied from the environmental information analysis unit 42.

The connection destination degree-of-interest analysis unit 51 analyzes magnitude of the degree of interest of the user of the connection destination, for example, based on a position at which the user of the connection destination is gazing, a length of a time in which a visual line is oriented to the display 22, the number of times the visual line is oriented to the display 22, and an orientation of the head of a user of the connection destination.

For example, the degree of interest of the user outside of the angle of camera field of the connection destination is analyzed by eye-tracking based on the information acquired by an infrared sensor of the connection destination. Based on a video in which the aspect outside of the angle of camera field of the connection destination is shown, the degree of interest of the user outside of the angle of camera field of the connection destination may be analyzed by a method of detecting the orientation of the face of the user of the connection destination.

The information acquired by the infrared sensor and the video in which the aspect outside of the angle of camera field of the connection destination is shown, which are used to analyze the degree of interest of the user of the connection destination, are information included in the environmental information of the connection destination.

The degree-of-interest information of the user of the connection destination which is information indicating the degree of interest of the user of the connection destination analyzed by the connection destination degree-of-interest analysis unit 51 is supplied to the indication sound output method selection unit 43 along with the sound information of the environmental sound of the connection destination and the information indicating the result of the analysis by the environmental information analysis unit 42.

The indication sound output method selection unit 43 selects a method of outputting the indication sound based on the degree-of-interest information of the user of the connection destination supplied from the connection destination degree-of-interest analysis unit 51. For example, the degree of interest of the user of the connection destination is determined based on a threshold and the output method for the indication sound is selected based on a determination result.

Operation of Telecommunication Device 11

Here, an operation of the telecommunication device 11 that has the configuration of FIG. 11 will be described with reference to the flowchart of FIG. 12.

Figure 12:
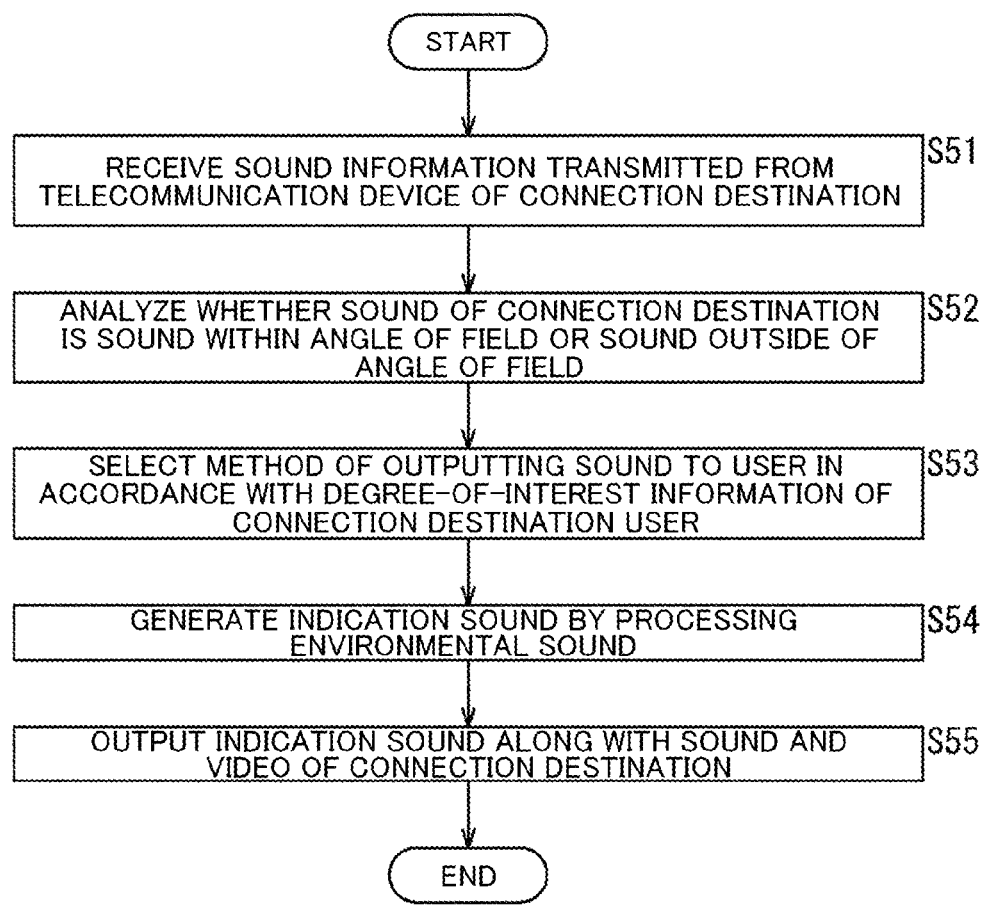
FIG. 12 is a flowchart illustrating an operation of the telecommunication device.

Processing to be described with reference to FIG. 12 is started, for example, after the video information and the sound information of the environmental sound are transmitted from the telecommunication device 11 of the connection destination via the network 12.

Processing of the connection destination degree-of-interest analysis unit 51 that analyzes the degree of interest of the user outside of the angle of camera field of the connection destination is appropriately performed in parallel to the processing of FIG. 12. The transmission unit 33 transmits the video information, the environmental information, and the sound information of the environmental sound acquired by the input unit 31 to the telecommunication device 11 of the connection destination via the network 12.

The processing of steps S51 and S52 is the same as the processing of steps S1 and S2 of FIG. 7. That is, the sound heard from within the angle of camera field and the sound heard from outside of the angle of camera field, which are included in the environmental sound of the connection destination, are analyzed.

In step S53, the indication sound output method selection unit 43 selects an output method for the indication sound in accordance with the degree-of-interest information of the user of the connection destination analyzed by the connection destination degree-of-interest analysis unit 51.

The processing of steps S54 and S55 of FIG. 7 is the same as the processing of steps S4 and S5. That is, the sound information of the indication sound is generated, and the indication sound is output along with the environmental sound and the video of the connection destination.

Through the foregoing processing, the telecommunication device 11 causes only the user interesting the person outside of the angle of camera field of the connection destination to be aware of presence of a person outside of the angle of camera field.

4. Third Output Control

Figure 13:
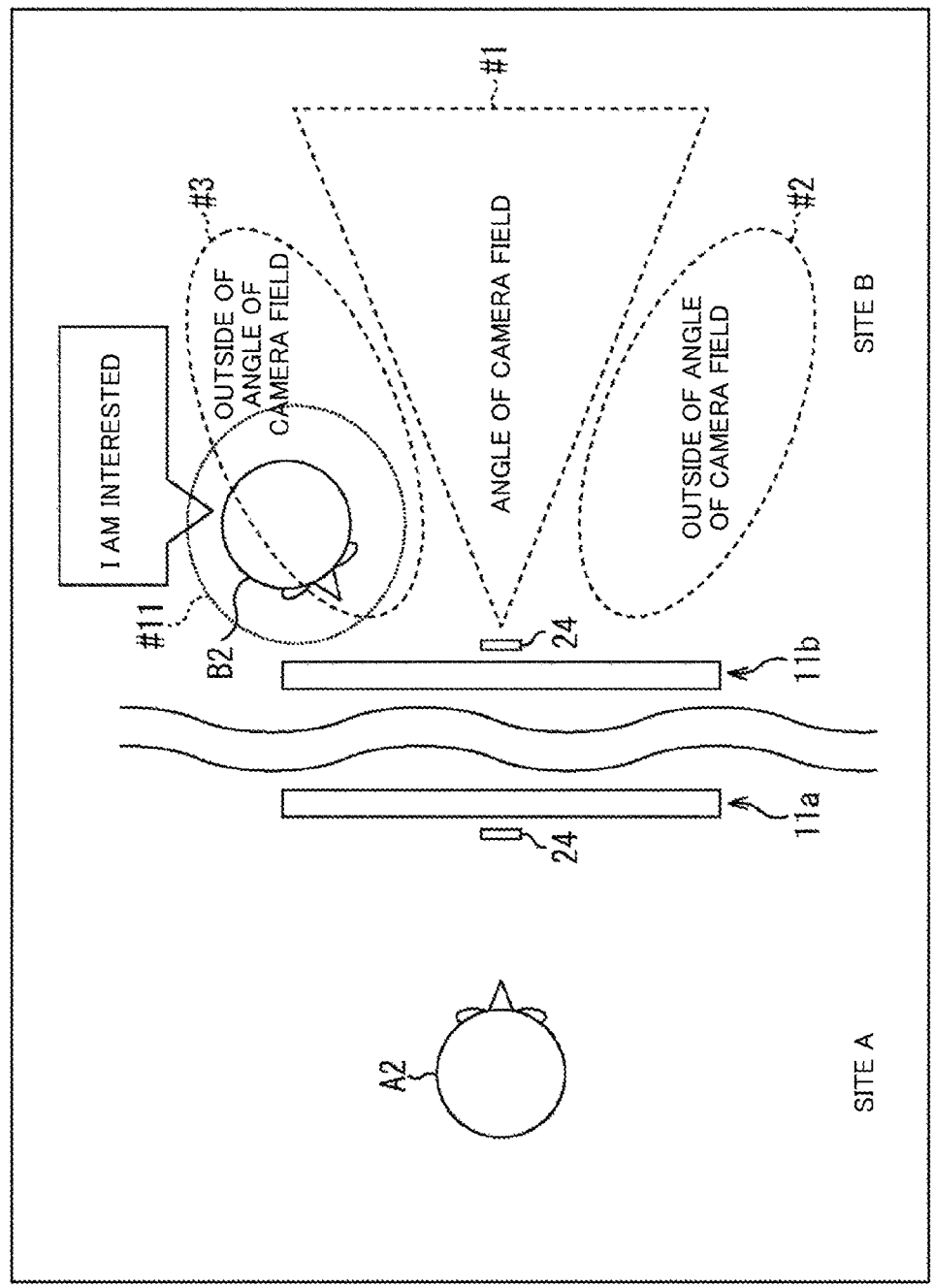
FIG. 13 is a diagram illustrating an overview of third output control of the telecommunication device.
Figure 14:
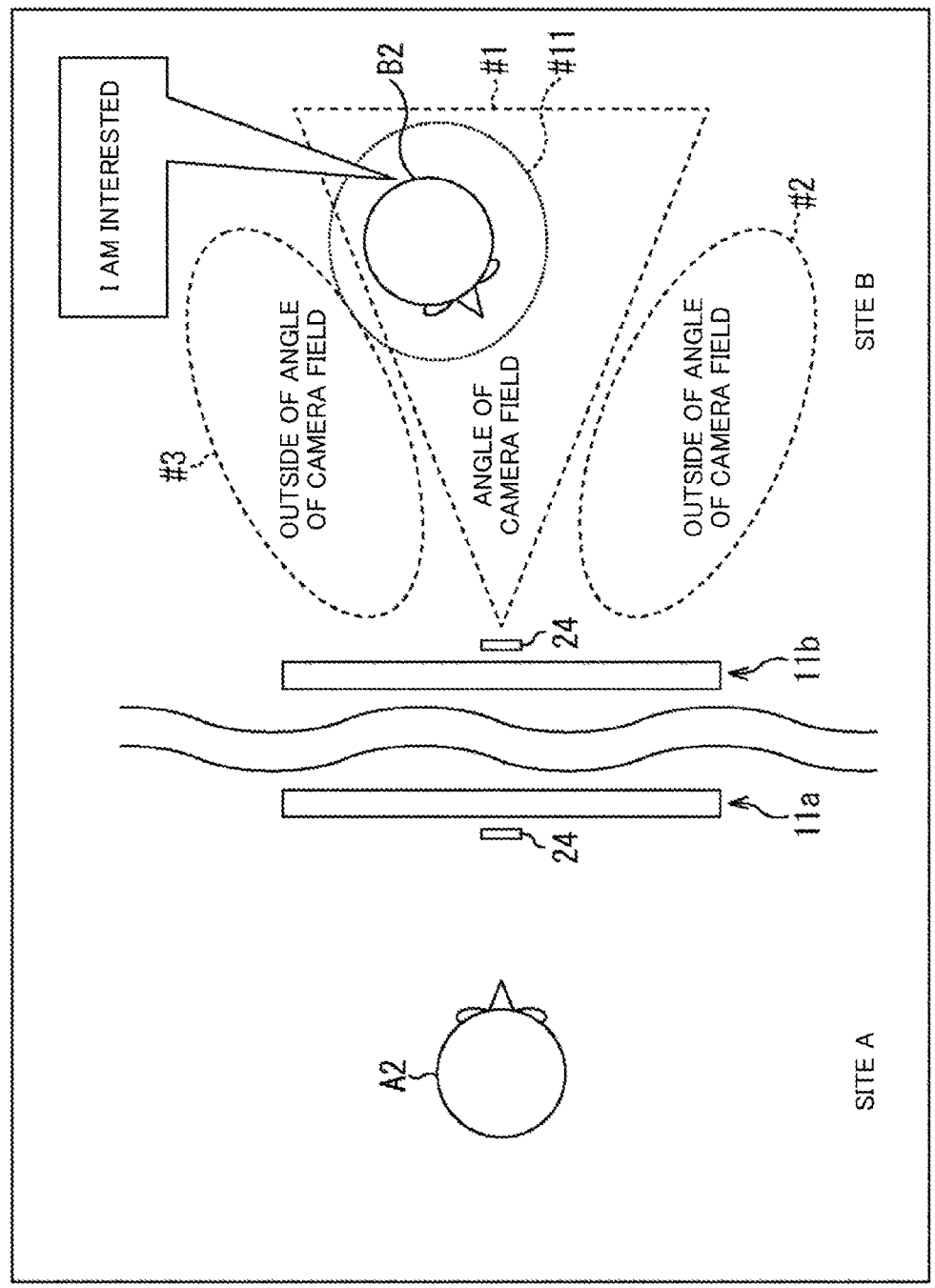
FIG. 14 is a diagram illustrating an overview of third output control of the telecommunication device.

FIGS. 13 and 14 are diagrams illustrating an overview of third output control of the telecommunication device 11.

In this example, output of the indication sound which is a surrounding sound of the user outside of the angle of camera field is controlled in accordance with the degree of interest of the user outside of the angle of camera field of the connection destination.

In the example of FIG. 13, the user A2 is in front of the telecommunication device 11a of the site A as in the case described with reference to FIG. 9. On the other hand, it is assumed that the user B2 is within range #3 of the site B. As indicated by a balloon of FIG. 13, the user B2 is interested in the video of the site A.

In this way, when the user B2 who is a user outside of the angle of camera field of the connection destination is interested in the video of the connection destination, the telecommunication device 11a outputs the emphasized indication sound toward the user A2 in whom the user B2 is interested. In this example, the sound heard from range #11 which is a surrounding range of the user B2 is output as an indication sound.

As illustrated in FIG. 14, when the user B2 who is interested in user A2 is within range #1, the telecommunication device 11a outputs the sound heard from range #11 as an indication sound.

Since a flow of the processing and the configuration of the telecommunication device 11 in the third output control are basically similar to those of the second output control, that is, the configuration illustrated in FIG. 11 and the flow of the processing illustrated in FIG. 12, description thereof will be omitted.

As described above, the user A2 can be aware of a person who is interested in the user A2 herself or himself outside of the angle of camera field or within the angle of camera field by the indication sound output from the telecommunication device 11a.

5. Fourth Output Control

Overview of Output Control

Figure 15:
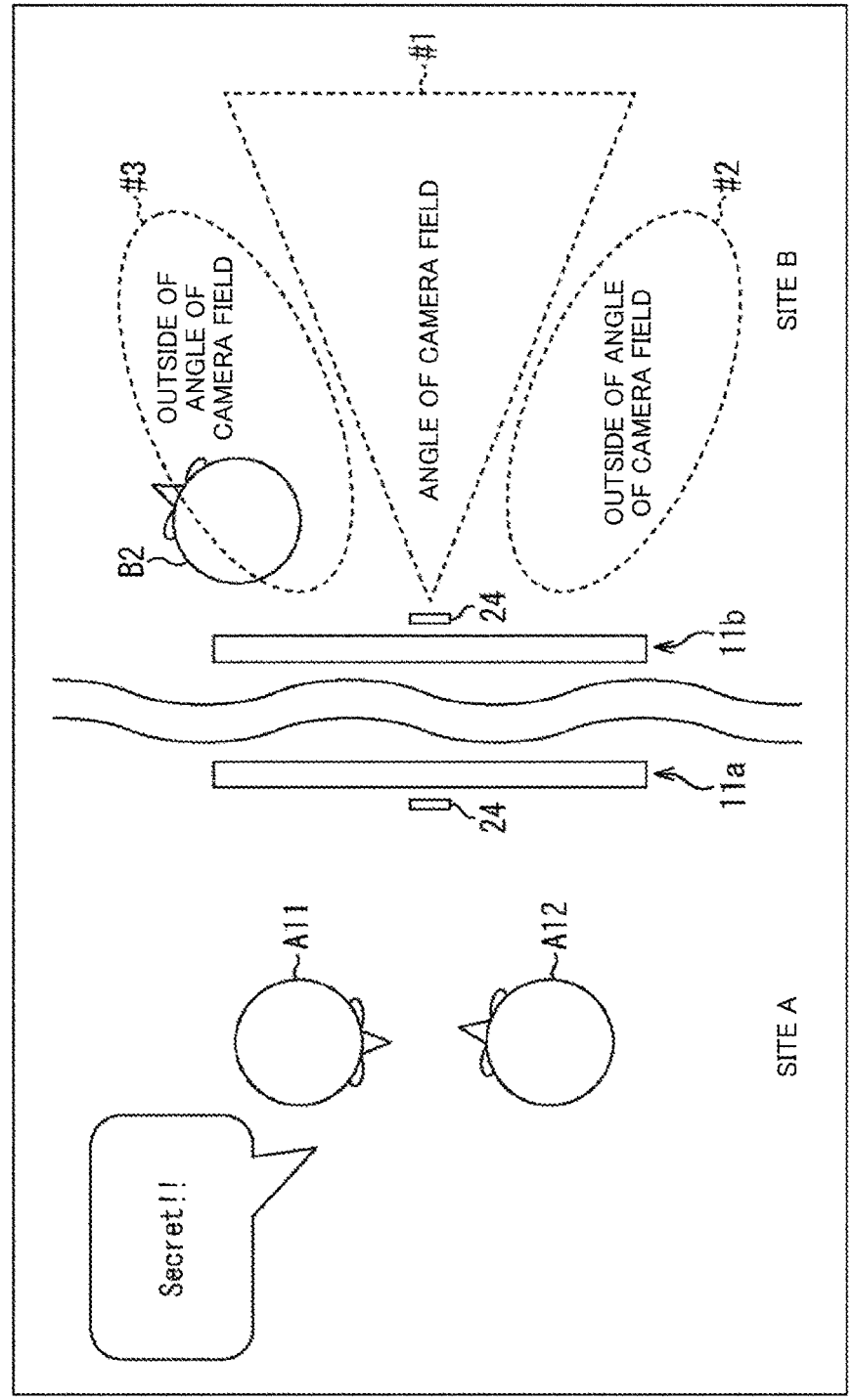
FIG. 15 is a diagram illustrating an overview of fourth output control of the telecommunication device.

FIG. 15 is a diagram illustrating an overview of fourth output control of the telecommunication device 11.

In this example, output of the sound in the telecommunication device 11b is controlled in accordance with the secrecy of an operation of a user who is in a space where the telecommunication device 11a is installed.

In the example of FIG. 15, it is assumed that users A11 and A12 who are two users are in front of the telecommunication device 11a of the site A. On the other hand, in the site B, it is assumed that only the user B2 is within range #3. As indicated by the balloon of FIG. 15, the users A11 and A12 are talking about content with the high secrecy such as private content without being aware of presence of the user B2 outside of the angle of camera field of the site B.

In such a situation, when a talk with high secrecy between the users A11 and A12 is detected in the site A, the telecommunication device 11b processes a secret sound collected in the site A based on the secrecy of the talk between the users A11 and A12 to degrade the quality of the sound and outputs the degraded sound. The secret sound is a sound such as a secret talk in the sound included in the environmental sound.

The user B2 hears the sound of talk content which is hard to hear because of degradation of the sound quality.

Thus, the telecommunication device 11b can output the sound of the talk having high secrecy between the users near the telecommunication device 11a of the connection destination with quality of the sound which is hard to hear to the user in the site B.

In the example of FIG. 15, the case in which the telecommunication device 11b detects the talk having high secrecy between the users A11 and A12 in the site A has been described. However, when a talk having high secrecy among a plurality of users in the site B is detected, the telecommunication device 11a can also perform similar processing.

Configuration of Telecommunication Device 11

Figure 16:
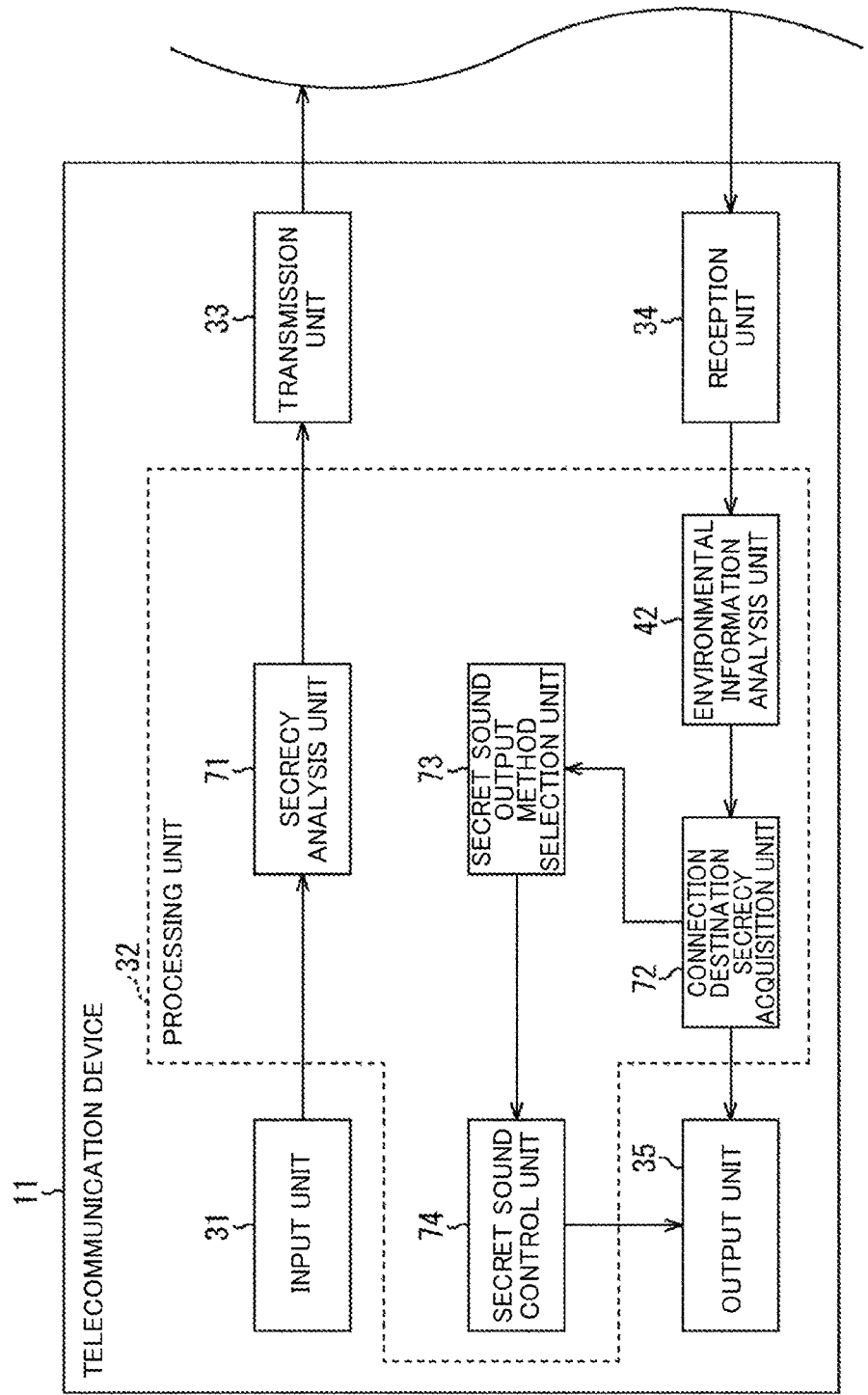
FIG. 16 is a block diagram illustrating a third exemplary configuration of the telecommunication device.

FIG. 16 is a block diagram illustrating a third exemplary configuration of the telecommunication device 11.

The configuration of the processing unit 32 illustrated in FIG. 16 is different from the configuration described with reference to FIG. 6 in that a secrecy analysis unit 71, a connection destination secrecy acquisition unit 72, a secret sound output method selection unit 73, and a secret sound control unit 74 are provided.

The video information, the environmental information, and the sound information of the environmental sound are supplied from the input unit 31 to the secrecy analysis unit 71.

The secrecy analysis unit 71 analyzes the secrecy of a sound of a user in the space where the telecommunication device 11 is installed based on the environmental information and the sound information of the environmental sound supplied from the input unit 31.

The secrecy analysis unit 71 determines that, for example, a sound of a talk having content unknown to the world or a sound of a talk having content which can hurt other people as a sound having high secrecy.

In the analysis of the level of the secrecy, a learning model generated through machine learning in accordance with a scheme such as a neural network or deep learning may be used.

Secrecy information which is information indicating secrecy of the sound of the user analyzed by the secrecy analysis unit 71 is supplied to the transmission unit 33 along with the video information, the environmental information, and the sound information of the environmental sound supplied from the input unit 31.

The transmission unit 33 transmits the video information, the environmental information, the sound information of the environmental sound, and the secrecy information supplied from the secrecy analysis unit 71 to the telecommunication device 11 of the connection destination via the network 12.

The reception unit 34 receives the video information, the environmental information, the sound information of the environmental sound, and the secrecy information of the connection destination transmitted from the telecommunication device 11 of the connection destination via the network 12 and supplies them to the environmental information analysis unit 42 of the processing unit 32.

The environmental information analysis unit 42 supplies information indicating a result of the analysis by the environmental information analysis unit 42 to the connection destination secrecy acquisition unit 72 along with the video information of the connection destination, the sound information of the connection destination, and the secrecy information of the connection destination.

The connection destination secrecy acquisition unit 72 supplies the output unit 35 with the video information and the sound information of the environmental sound of the connection destination supplied from the environmental information analysis unit 42.

The connection destination secrecy acquisition unit 72 supplies the secret sound output method selection unit 73 with the secrecy information and the sound information of the environmental sound of the connection destination supplied from the environmental information analysis unit 42 and the information indicating the result of the analysis by the environmental information analysis unit 42.

The secret sound output method selection unit 73 selects a method of outputting the secret sound based on the secrecy information supplied from the connection destination secrecy acquisition unit 72 and the information indicating the result of the analysis by the environmental information analysis unit 42. For example, the secret sound output method selection unit 73 selects a method of distorting the secret sound or a method of raising a level of only a specific frequency.

Information indicating the method of outputting the secret sound is supplied to the secret sound control unit 74 along with the secrecy information and the sound information of the environmental sound of the connection destination.

The secret sound control unit 74 generates the sound information of the secret sound by processing the sound information of the environmental sound of the connection destination based on the secrecy information of the connection destination supplied from the secret sound output method selection unit 73. For example, the secret sound control unit 74 generates the sound information of the secret sound by extracting sound information of a sound of a talk having high secrecy from the sound information of the environmental sound of the connection destination.

The secret sound control unit 74 processes the secret sound based on information indicating the method of outputting the secret sound supplied from the secret sound output method selection unit 73. The secret sound control unit 74 supplies the sound information of the processed secret sound to the output unit 35 to output the processed secret sound.

Operation of Telecommunication Device 11

Here, an operation of the telecommunication device 11 that has the configuration of FIG. 16 will be described with reference to the flowchart of FIG. 17.

Figure 17:
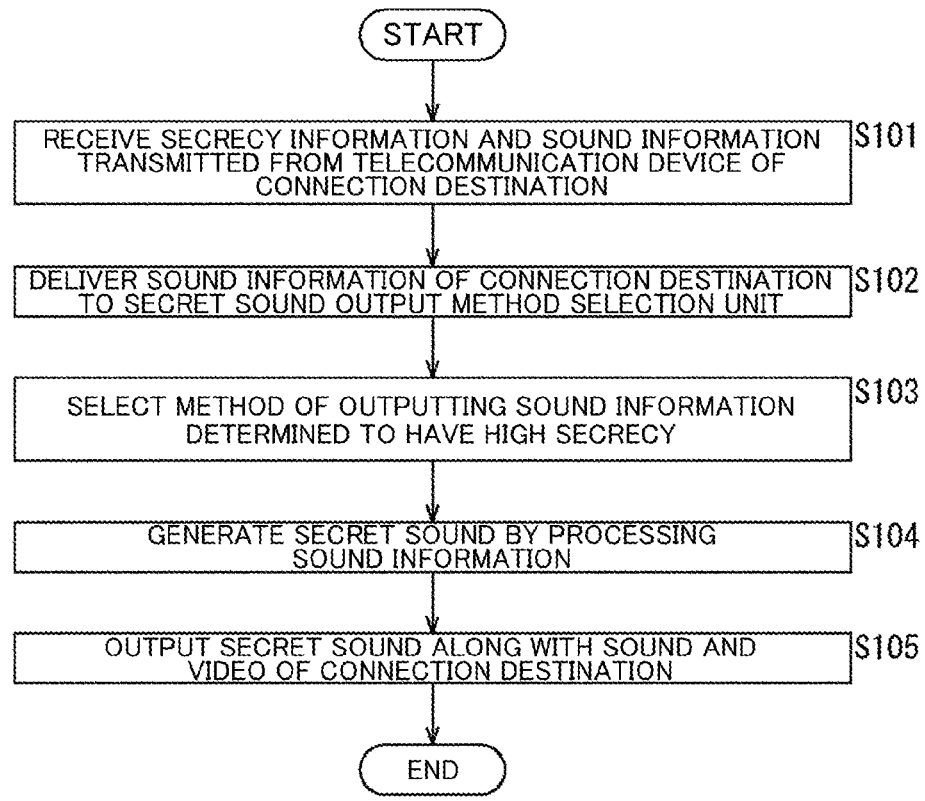
FIG. 17 is a flowchart illustrating an operation of the telecommunication device.

Processing to be described with reference to FIG. 17 is started, for example, when the video information, the sound information of the environmental sound, and the secrecy information are transmitted from the telecommunication device 11 of the connection destination via the network 12.

The transmission unit 33 transmits the video, the sound information of the environmental sound, and the secrecy information acquired by the input unit 31 to the telecommunication device 11 of the connection destination via the network 12.

In step S101, the reception unit 34 receives the video information, the sound information of the environmental sound, and the secrecy information of the connection destination transmitted from the telecommunication device 11 of the connection destination.

In step S102, the environmental information analysis unit 42 and the connection destination secrecy acquisition unit 72 supplies the sound information of the environmental sound of the connection destination to the secret sound output method selection unit 73 along with the secrecy information and information indicating a result of the analysis by the environmental information analysis unit 42.

In step S103, the secret sound output method selection unit 73 selects the method of outputting the secret sound based on the secrecy information of the connection destination.

In step S104, the secret sound control unit 74 generates the secret sound by processing the sound information of the environmental sound of the connection destination based on the secrecy information of the connection destination. The secret sound control unit 74 processes the secret sound based on information indicating the method of outputting the secret sound. As described above, the generation of the secret sound and the processing of the secret sound are processing performed when there are users performing a talk having high secrecy.

In step S105, the secret sound control unit 74 causes the output unit 35 to output the processed secret sound along with the environmental sound and the video of the connection destination.

Through the foregoing processing, the sound of the talk having the high secrecy can be prevented from being presented to a user outside of the angle of camera field of the telecommunication device 11 of the connection destination.

A surrounding indication sound of the user outside of the angle of camera field of the connection destination may be output toward users who are performing an action having high secrecy so that the users can be aware of presence of the user outside of the angle of camera field of the connection destination.

Figure 18:
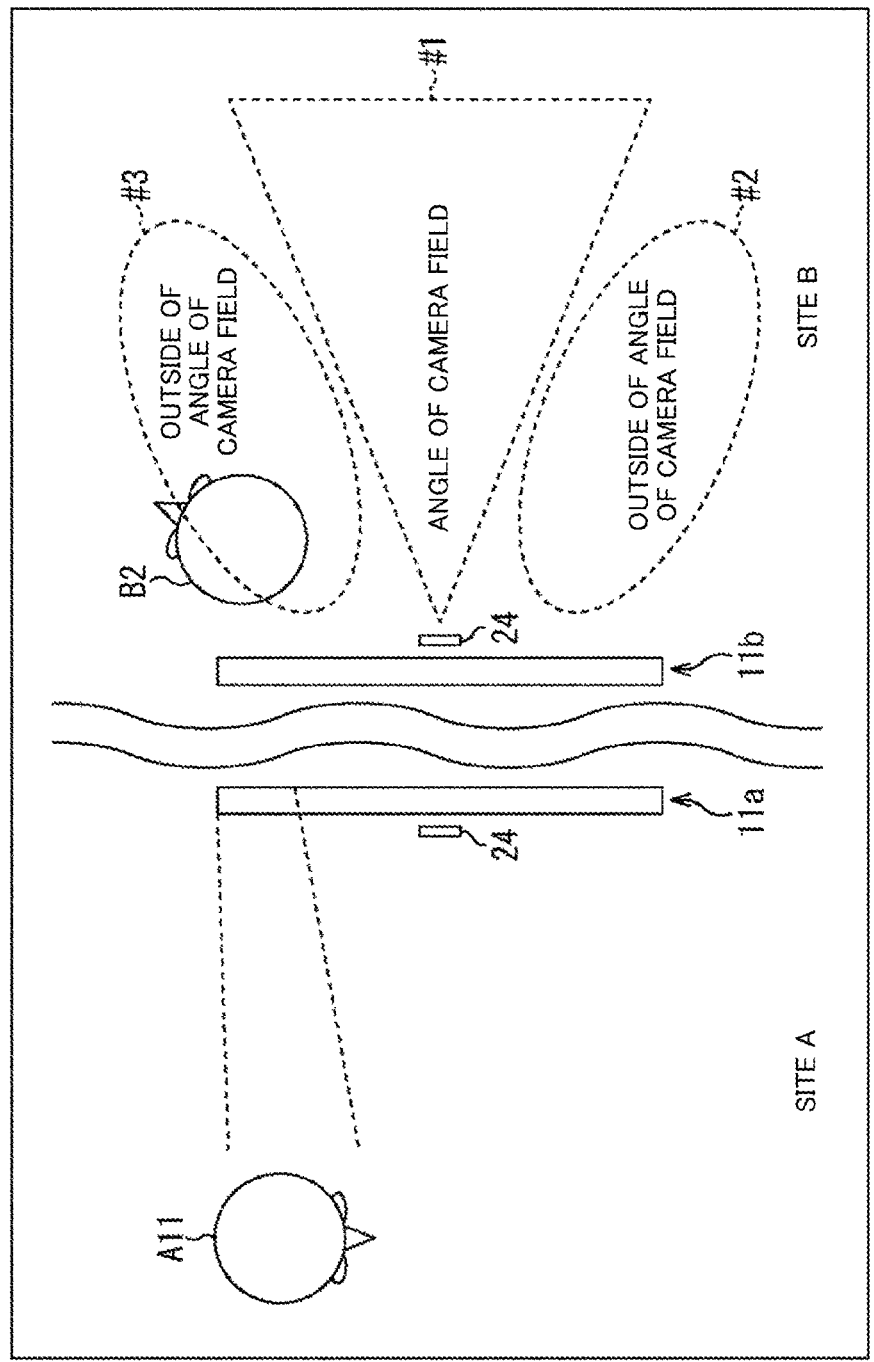
FIG. 18 is a diagram illustrating an overview of other output control performed by the telecommunication device.

FIG. 18 is a diagram illustrating an overview of another output control performed by the telecommunication device 11.

In the example of FIG. 18, it is assumed that the user A11 is in front of the telecommunication device 11a of the site A. On the other hand, it is assumed that only the user B2 is within range #3 of the site B. The user A11 is a user who is performing an action having high secrecy, such as a private action, without being aware of the user B2 outside of the angle of camera field.

When it is detected that the user A11 is performing the action having high secrecy, the telecommunication device 11a outputs an emphasized indication sound toward the user A11. The output of the indication sound outside of the angle of camera field of the connection destination is controlled in accordance with a level of the secrecy of the action performed by the user A11 who is in the site A. The user A11 may be notified in accordance with another scheme without being limited to the indication sound.

Since the indication sound is output toward the user A11 performing the action having the high secrecy, the telecommunication device 11 can cause only the user A11 to be aware of presence of the person outside of the angle of camera field.

For example, the user A11 who is aware of presence of the person outside of the angle of camera field of the connection destination can stop the action having the high secrecy.

In this way, by presenting the indication sound to only the user who is performing the action having the high secrecy, the user can be aware of the presence of the person outside of the angle of camera field in a more appropriate form.

6. Modification Examples

Illuminant

Presence of a person outside of an angle of camera field of a connection destination may be presented using luminescence of an illuminant provided in the telecommunication device 11.

Figure 19:
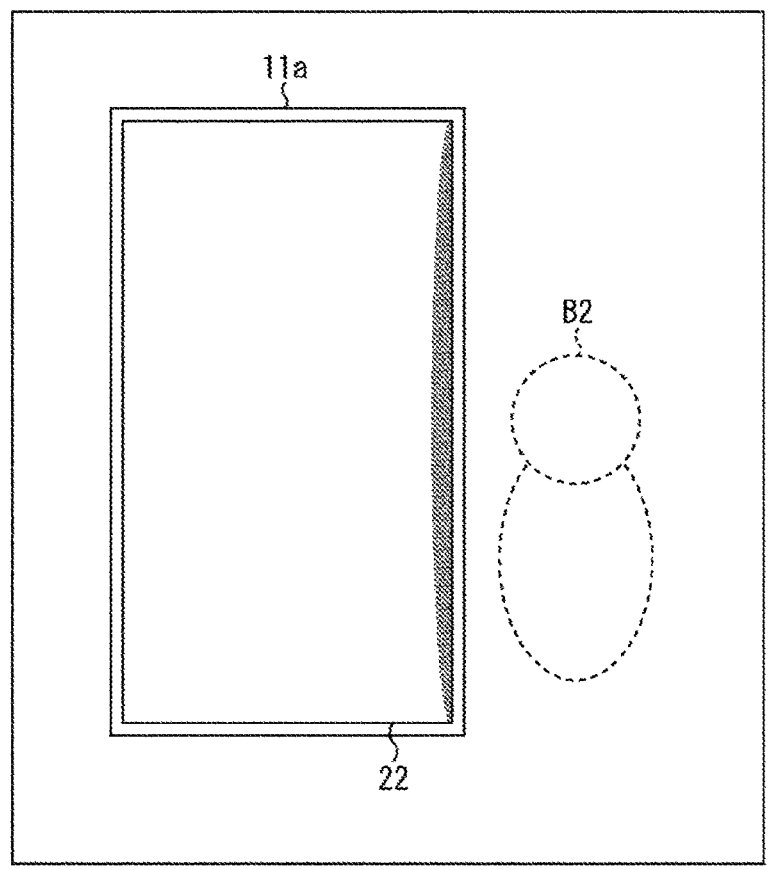
FIG. 19 is a front view illustrating an example of the telecommunication device in which an illuminant is provided.

FIG. 19 is a front view illustrating an example of the telecommunication device 11a in which an illuminant is provided.

For example, an illuminant is provided on an upper, lower, left, or left edge of the display 22 of the telecommunication device 11a.

When the user B2 is outside of the angle of camera field of the telecommunication device 11b, as illustrated in FIG. 19, a video of the user B2 is not shown on the display 22 of the telecommunication device 11a. In FIG. 19, the dotted line of the user B2 to the right of the telecommunication device 11a indicates that the user B2 is outside of the angle of camera field in the site B.

In this case, the telecommunication device 11a causes an illuminant provided on a right edge portion, which is an illuminant for an edge in a direction in which there is the user B2, to emit light. In FIG. 19, a portion in which the right end of the display 22 is colored indicates that the illuminant emits light.

When there is only one user around the telecommunication device 11a or the presence of a person outside of the angle of camera field is simultaneously delivered to a plurality of users around the telecommunication device 11a, light is emitted to suggest the presence of a person outside of the angle of camera field. The intensity of light of the illuminant may indicate the degree of interest of the user B2 in a video of the site A.

Figure 20:
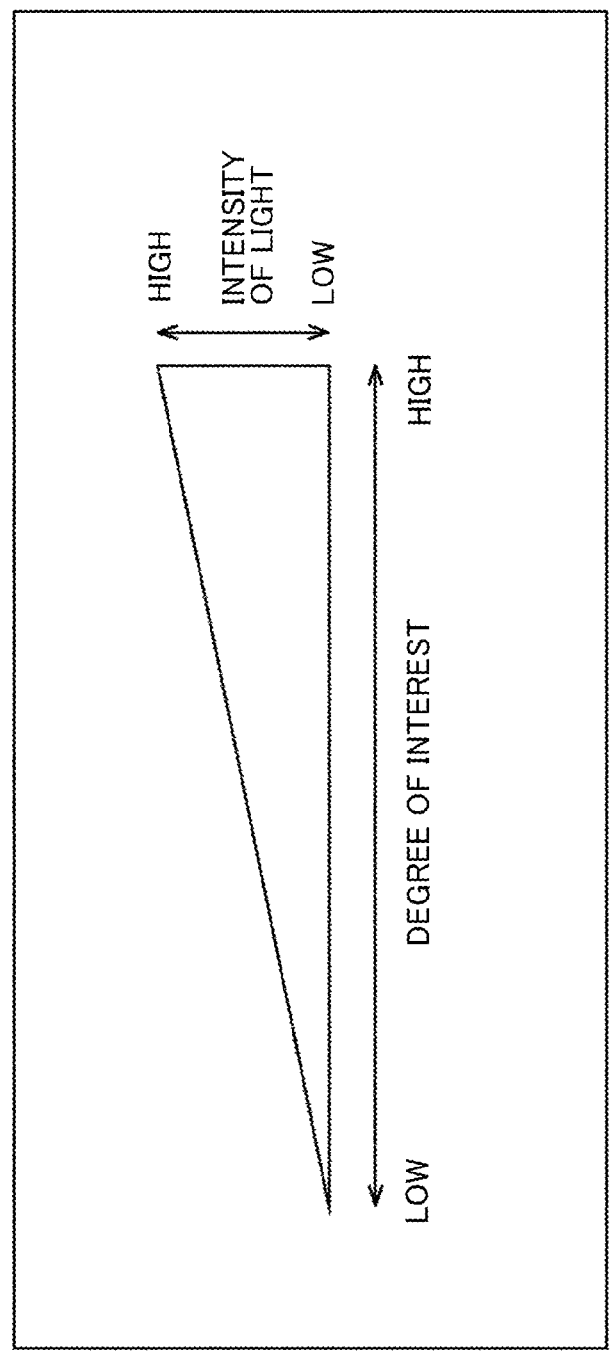
FIG. 20 is a diagram illustrating an example of a relation between intensity of light and the degree of interest.

FIG. 20 is a diagram illustrating an example of relation between intensity of light and the degree of interest.

In FIG. 20, the horizontal axis represents the degree of interest of the user B2, and the vertical axis represents intensity of light.

As illustrated in FIG. 20, the telecommunication device 11a causes strong light to be emitted, for example, as the degree of interest of the user B2 outside of an angle of camera field of a connection destination is higher.

A user of the telecommunication device 11a can know the degree of interest of a user outside of the angle of camera field of the connection destination in accordance with the intensity of light from the illuminant.

The degree of interest of the user outside of the angle of camera field of the connection destination is notified of by causing a portable terminal such as a smartphone carried by the user of the telecommunication device 11a to vibrate. In this case, the indication sound control unit 44 of the telecommunication device 11a controls the portable terminal carried by the user of the telecommunication device 11a such that the portable terminal vibrates in accordance with the degree of interest of the user B2 outside of the angle of camera field of the connection destination.

Camera 24 and Sensor 25

The camera 24 and the sensor 25 provided in the sensor unit 23 have been described above. However, the camera 24 and the sensor 25 may be provided in another form.

Figure 21:
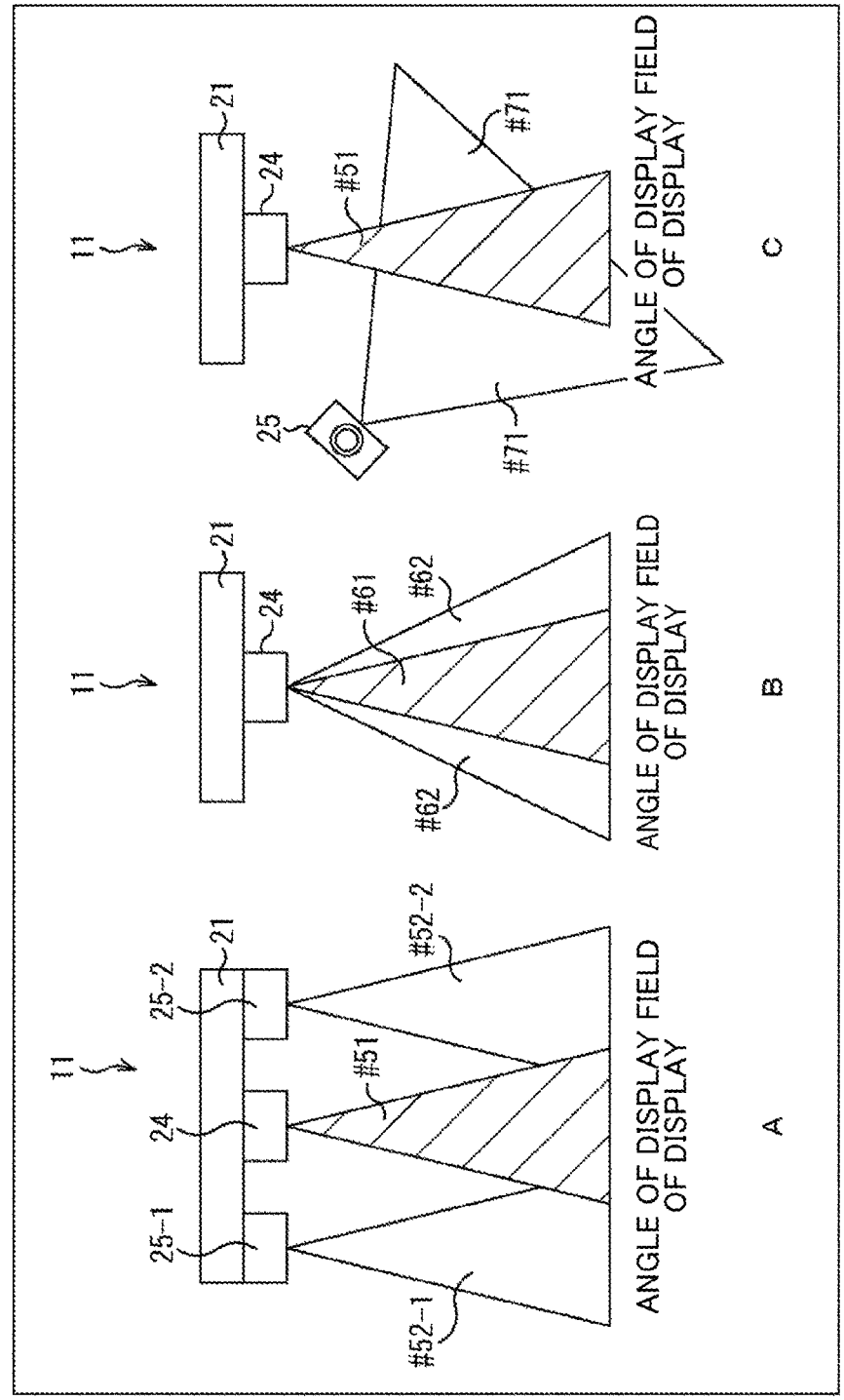
FIG. 21 is a diagram schematically illustrating examples of forms of a camera and a sensor.

FIG. 21 is a diagram schematically illustrating examples of forms of the camera 24 and the sensor 25.

As illustrated in A of FIG. 21, the camera 24 and the sensor 25 can be separately provided. In the example of A of FIG. 21 the sensors 25-1 and 25-2 configured as the cameras are provided at left and right ends of a frame 21.

A video with range #51 which is a range of an angle of field of the camera 24 is displayed on the display 22 of the telecommunication device 11 of a connection destination. Videos with ranges #52-1 and #52-2 are used to detect an aspect outside of an angle of display field of the display (outside of an angle of field of the camera 24).

Ranges #52-1 and #52-2 are a range of the angles of field of the sensors 25-1 and 23-2, excluding a range overlapping range #51.

As illustrated in B of FIG. 21, the camera 24 can also be used as the sensor 25. For example, the camera 24 is configured by a wide-angle camera and is provided in the middle of the telecommunication device 11.

A video with range #61 indicating a range of a part of a range of the angle of field of the camera 24 is displayed on the display 22 of the telecommunication device 11 of the connection destination. A video with range #62 is used to detect an aspect outside of the angle of display field of the display.

Range #62 is a range of an angle of field of the camera 24 excluding range #61.

As illustrated in C of FIG. 21, the sensor 25 may be provided outside of the telecommunication device 11. For example, a camera configured as the sensor 25 is provided on a wall different from a wall on which the telecommunication device 11 is installed.

As in A of FIG. 21, a video with range #51 which is a range of the angle of field of the camera 24 is displayed on the display 22 of the telecommunication device 11 of the connection destination. A video with range #71 is used to detect an aspect outside of the angle of display field of the display.

Range #71 is a range of the angle of field of the sensor 25 excluding a region overlapping range #51.

System Configuration

In FIG. 6 and the like, the processing unit 32 is provided in the telecommunication device 11. Some or all of the functions of the processing unit 32 may be implemented by a server connected to the network 12.

Figure 22:
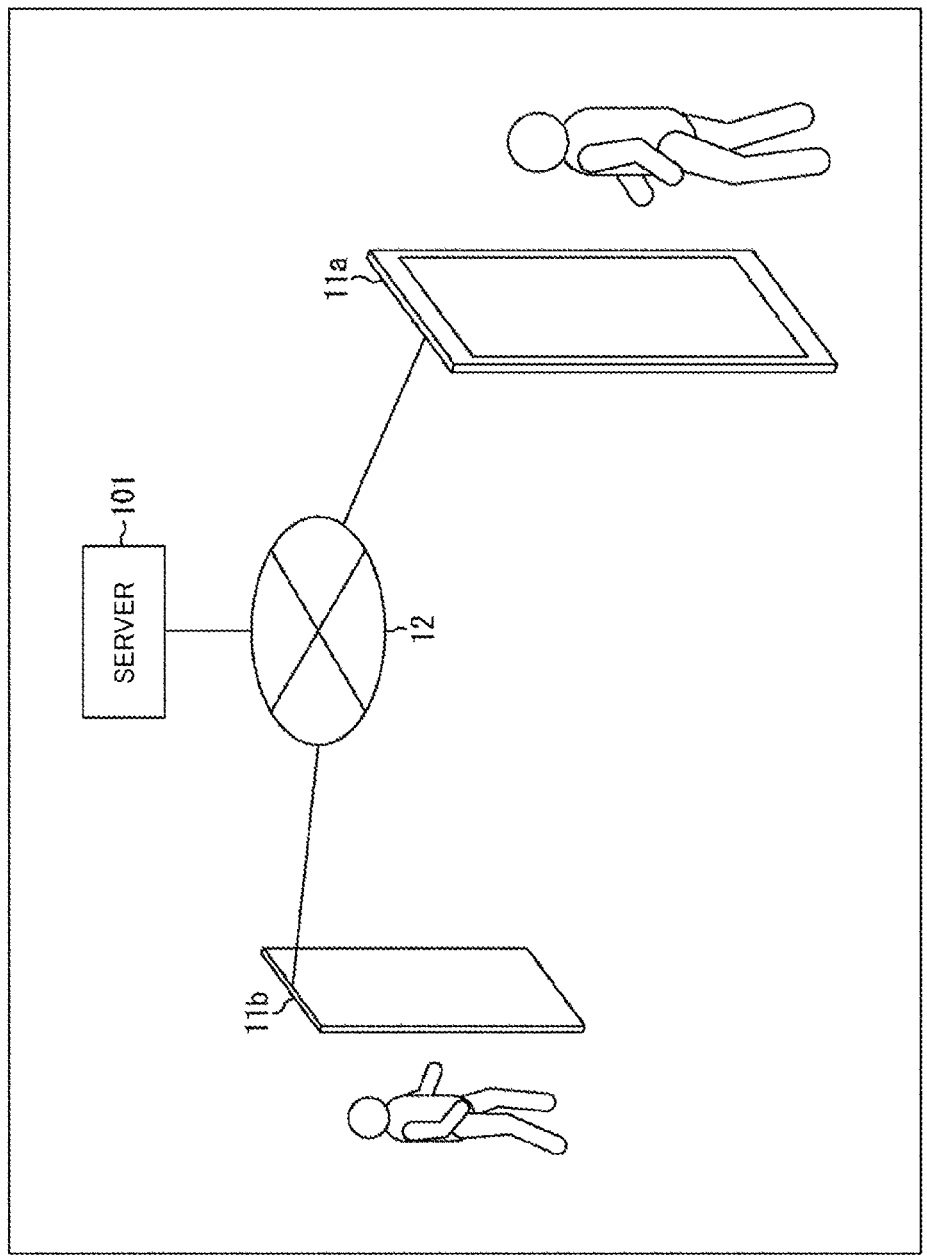
FIG. 22 is a diagram illustrating another exemplary configuration of the video communication system.

FIG. 22 is a diagram illustrating another exemplary configuration of the video communication system.

The video communication system illustrated in FIG. 22 is configured such that the telecommunication device 11a, the telecommunication device 11b, and a server 101 are connected to each other via the network 12 such as the Internet. In the server 101, a configuration of a part or all of the processing unit 32 described with reference to FIG. 6, 11, or 16 is provided.

In this way, the processing unit 32 may be provided outside of the telecommunication device 11.

For example, various kinds of information such as video information, environmental information, and sound information such as an environmental sound are transmitted from the telecommunication device 11 to the server 101.

For example, various kinds of information such as video information, environmental information, and sound information such as an environmental sound of a connection destination are transmitted from the server 101 to the telecommunication device 11.

A home server controlling the telecommunication device 11 may be provided for telecommunication device 11.

Figure 23:
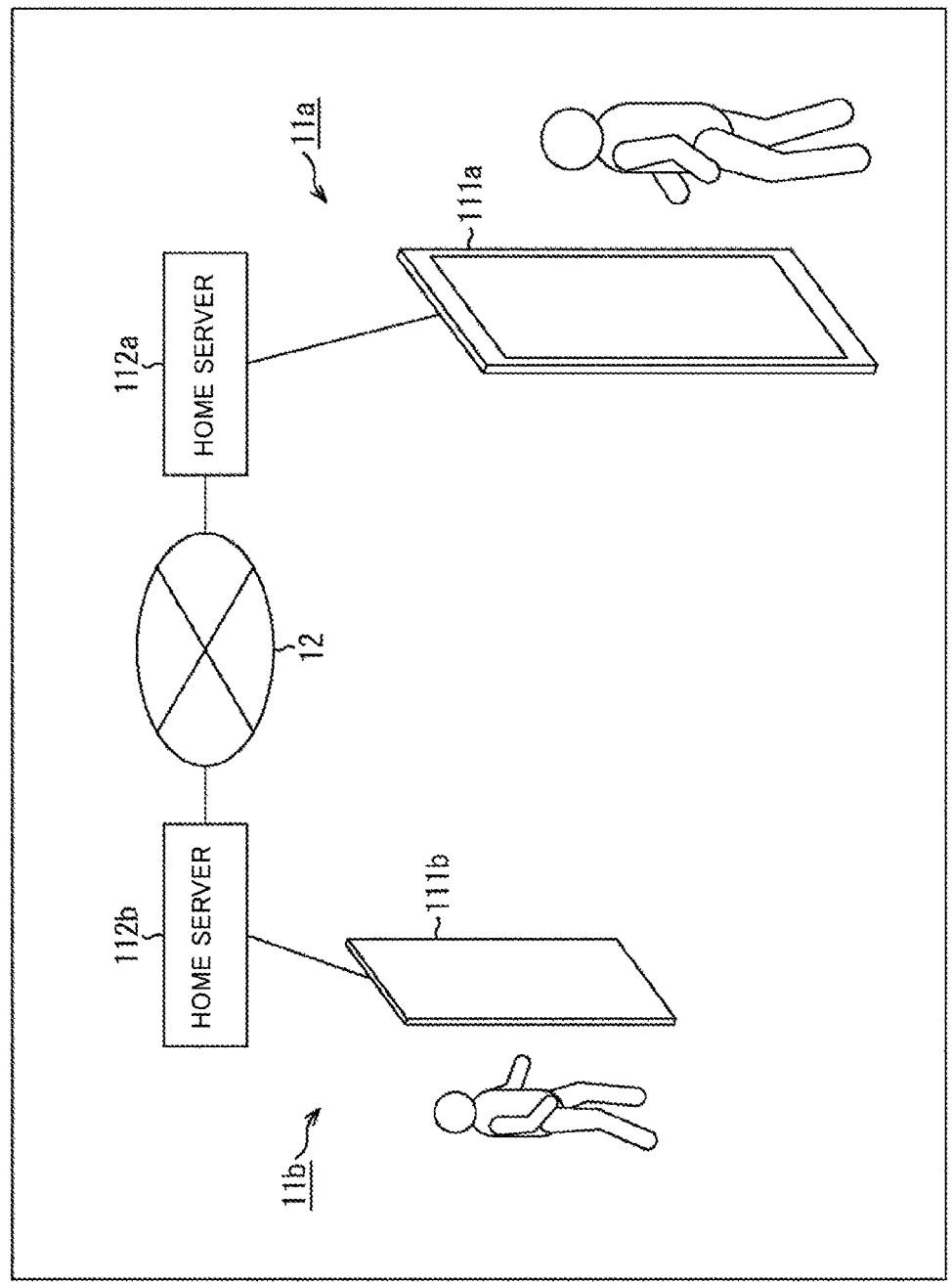
FIG. 23 is a diagram illustrating still another exemplary configuration of the video communication system.

FIG. 23 is a diagram illustrating still another exemplary configuration of the video communication system.

A video communication system illustrated in FIG. 23 is configured such that the telecommunication device 11a and the telecommunication device 11b are connected via the network 12.

The telecommunication device 11a includes an input/output unit 111a and a home server 112a. In the input/output unit 111a, the configurations of the input unit 31 and the output unit 35 are provided. In the home server 112a, the configurations of the processing unit 32, the transmission unit 33, and the reception unit 34 are provided. The home server 112a is connected to the home server 112b of the telecommunication device 11b via the network 12.

Similarly, the telecommunication device 11b includes an input/output unit 111b and a home server 112b. In the input/output unit 111b, the configurations of the input unit 31 and the output unit 35 are provided. In the home server 112b, the configurations of the processing unit 32, the transmission unit 33, and the reception unit 34 are provided. The home server 112b is connected to the home server 112a via the network 12.

In this way, the configuration of the processing unit 32 or the like may be provided outside of the input/output unit 111 including the display 22 or the like.

A partial configuration of the processing unit 32 may be provided in the home servers 112a and 112b and the remaining configuration of the processing unit 32 may be provided in the input/output unit 111a and 111b.

As described above, in the present technology, when, between a space of the site A at which the telecommunication device 11a is installed and a space of the site B at which the telecommunication device 11b is installed, a video of captured images captured by the camera 24 in one space is displayed in real time by the display 22 in the other space, processing is performed to notify a user at the site A that there is the user when the user at a position outside of an angle of field of the camera 24 installed at the site B is detected.

Thus, the user viewing the video of the site B at the site A can be allowed to be aware of presence of the person outside of the angle of field of the video of the site B in a more appropriate form.

In particular, in the present technology, processing is performed to notify a user who is a specific target among users at the site A of an indication sound, which is included in sounds collected by the microphone 26 installed at the site B outside of the angle of field of the camera 24 installed at the site B.

Thus, when there are a plurality of users viewing the aspect of the site B at the site A, only some users who pay attention to the person outside of the angle of camera field can be aware of presence of a person outside of the angle of camera field.

Example of Computer

Each processing described with reference to the above-described flowchart may not necessarily be performed chronologically in the order described in the flowchart and includes processing performed in parallel or individually (for example, parallel processing or processing in accordance with an object). A program may be processed by a single CPU or may be distributed and processed by a plurality of CPUs.

The series of steps of processing by the above-described telecommunication device 11 and the like can be performed by hardware or software. When the series of steps of processing are performed by software, a program of the software is installed from a program recording medium that records the program to a computer embedded in dedicated hardware or, for example, a general-purpose personal computer capable of performing various functions by installing the various programs.

Figure 24:
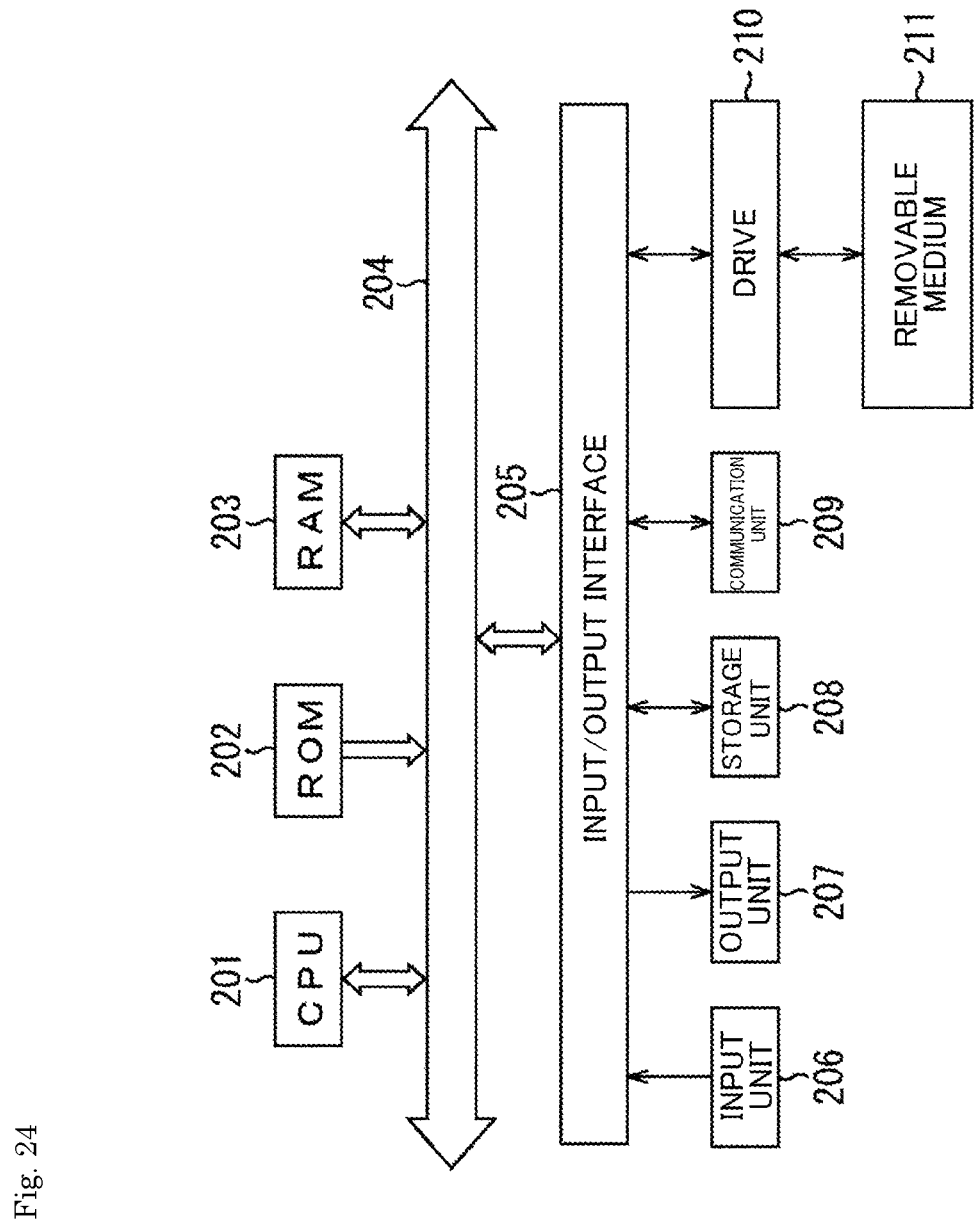
FIG. 24 is a block diagram illustrating an exemplary hardware configuration of a computer.

FIG. 24 is a block diagram illustrating an exemplary hardware configuration of a computer that performs the above-described series of steps of processing in accordance with a program.

In the computer, a CPU 201, a ROM 202, and a RAM 203 are connected to each other via a bus 204.

An input/output interface 205 is further connected to the bus 204. An input unit 206 such as a keyboard, a mouse, or a microphone, an output unit 207 such as a display or a speaker, a storage unit 208 such as a hard disk or a nonvolatile memory, a communication unit 209 such as a network interface, and a drive 210 driving a removable medium 211 such as a magnetic disk, an optical disc, a magneto-optical disk, or a semiconductor memory are connected to the input/output interface 205.

In the computer that has the foregoing configuration, the CPU 201 performs the foregoing series of steps of processing, for example, by loading the program stored in the storage unit 208 to the RAM 203 via the input/output interface 205 and the bus 204 and executing the program.

For example, the program executed by the computer (the CPU 201) is recorded on the removable medium 211 which is a package medium such as a magnetic disk (including a flexible disk), an optical disc (a compact disc-read only memory (CD-ROM), a digital versatile disc (DVD), or the like), a magneto-optical disk, or a semiconductor memory, or is provided via a wired or wireless transmission medium such as a local area network, the Interest, or digital satellite broadcasting.

The program can be installed to the storage unit 208 via the input/output interface 205 by mounting the removable medium 211 on the drive 210. The program can be received by the communication unit 209 via a wired or wireless transmission medium to be installed in the storage unit 208. Further, the program can be installed in advance in the ROM 202 or the storage unit 208.

Others

In the present specification, the system means a set of a plurality of constituent elements (devices, modules (components), or the like) and all the constituent elements may be included or not included in the same casing. Accordingly, a plurality of devices accommodated in separate casings and connected via a network and one device in which a plurality of modules are accommodated in one casing may all be a system.

The advantageous effects described in the present specification are merely exemplary and are not restrictive and other advantageous effects may be realized.

Embodiments of the present technology are not limited to the above-described embodiments and can be modified in various forms within the scope of the present technology departing from the gist of the present technology.

For example, the present technology may have a configuration of clouding computing in which a plurality of devices share and process one function together via a network.

<Combination Examples of Configurations>

The present technology can be configured as follows.

(1)

An information processing device including a processing unit,
  wherein, between a first space where a first imaging device and a first display device are installed and a second space where a second imaging device and a second display device are installed, when a captured image captured by the imaging device in one of the spaces is displayed by the display device in the other space in real time,
  the processing unit performs processing to notify first users in the first space that second users are outside of an angle of field of the second imaging device when the second users who are at positions outside of the angle of field of the second imaging device are detected.

(2)

The information processing device according to (1), wherein the processing unit performs processing to notify a first specific user who is a specific target among the first users in the first space of an indication sound outside of the angle of field of the second imaging device included in sounds collected in the second space.

(3)

The information processing device according to (2),
  wherein the processing unit includes
  an output control unit that outputs the sounds collected in the second space to a first sound output device installed in the first space in real time, and
  an analysis unit that analyzes the indication sound outside of the angle of field of the second imaging device among the sounds collected in the second space, and
  wherein the output control unit outputs the indication sound to the first sound output device in real time based on an analysis result of the indication sound.

(4)

The information processing device according to (3),
  wherein the processing unit further includes an output method selection unit that selects an output method for the indication sound based on the analysis result of the indication sound, and
  wherein the output control unit causes the first sound output device to output the indication sound using an output method for a selection target.

(5)
The information processing device according to (4),
wherein the processing unit further includes a first degree-of-interest analysis unit that analyzes the degree of interest of a first interested user who is present at the first space and interested in an outside of the angle of field of the second imaging device with respect to the outside of the angle of field of the second imaging device, and
wherein the output method selection unit selects an output method for the indication sound in accordance with the degree of interest of the first interested user.

(6)
The information processing device according to (5), wherein the output control unit causes the indication sound to be output to the first interested user among the first users in the first space.

(7)
The information processing device according to (5) or (6), wherein the first degree-of-interest analysis unit analyzes the degree of interest of the first interested user based on a position which is outside of the angle of field of the second imaging device and to which a visual line of the first interested user is oriented, a length of a time in which the visual line of the first interested user is oriented outside of the angle of field of the second imaging device, an orientation of the head of the first interested user, and a sound spoken by the first interested user.

(8)
The information processing device according to (6),
wherein the output method selection unit selects a method of adjusting and outputting directivity of the indication sound as the output method for the indication sound, and
wherein the output control unit causes the indication sound of which the directivity is adjusted to be output to the first interested user.

(9)
The information processing device according to (4),
wherein the processing unit further includes a second degree-of-interest analysis unit that analyzes the degree of interest of the second users at a position outside of the angle of field of the second imaging device in the second space with respect to the first space, and
wherein the output control unit selects an output method for the indication sound in accordance with the degree of interest of a second interested user interested in the first space.

(10)
The information processing device according to (9), wherein the output control unit causes the indication sound to be output to a first user of interest in whom the second interested user is interested among the first users in the first space.

(11)
The information processing device according to (10), wherein the second degree-of-interest analysis unit analyzes the degree of interest of the second interested user based on a position of the first space to which a visual line of the second interested user is oriented, a length of a time in which the visual line of the second interested user is oriented to the first user of interest, the number of times the visual line of the second interested user is oriented to the first user of interest, and an orientation of the head of the second interested user.

(12)
The information processing device according to (10),
wherein the output method selection unit selects a method of adjusting and outputting directivity of the indication sound as the output method for the indication sound, and
wherein the output control unit causes the indication sound of which the directivity is adjusted to be output to the first user of interest.

(13)
The information processing device according to any one of (9) to (12), wherein the output control unit causes the first sound output device to output a surrounding sound of the second interested user as an indication sound.

(14)
The information processing device according to (9), wherein the output control unit causes an illuminant installed in the first space to emit light in accordance with the degree of interest of the second interested user.

(15)
The information processing device according to (9), wherein the output control unit causes a device carried by the first user of interest in whom the second interested user is interested to vibrate among the first users in the first space in accordance with the degree of interest of the second interested user.

(16)
The information processing device according to (1),
wherein the processing unit includes
an output control unit that causes the first sound output device installed in the first space to output sounds collected in the second space in real time, and a secrecy acquisition unit that acquires secrecy of actions performed by the second users in the second space, and
wherein the output control unit causes a secret sound to be output to the first users in the first space in accordance with the secrecy.

(17)
The information processing device according to (1),
wherein the processing unit includes
an output control unit that causes the first sound output device installed in the first space to output sounds collected in the second space in real time, and a secrecy analysis unit that analyzes secrecy of actions performed by the first users in the first space, and
wherein the output control unit causes an indication sound to be output to the first users in the first space in accordance with the secrecy when the second users are outside of the angle of field of the second imaging device in the second space.

(18)
The information processing device according to any one of (1) to (17), wherein the first imaging device and the first display device installed in the first space and the second imaging device and the second display device installed in the second space are integrated and are connected to an information processing device installed in the other space via a network.

(19)
An information processing method,
wherein, between a first space where a first imaging device and a first display device are installed and a second space where a second imaging device and a second display device are installed, when a captured image captured by the imaging device in one of the spaces is displayed by the display device in the other space in real time,
an information processing device performs processing to notify first users in the first space of a sound heard from outside of the angle of field of the second imaging device when the sound heard from outside of the angle of field of the second imaging device is detected among sounds collected in the second space.

(20)

A program causing a computer to perform, between a first space where a first imaging device and a first display device are installed and a second space where a second imaging device and a second display device are installed, when a captured image captured by the imaging device in one of the spaces is displayed by the display device in the other space in real time, processing to notify first users in the first space of a sound heard from outside of the angle of field of the second imaging device when the sound heard from outside of the angle of field of the second imaging device is detected among sounds collected in the second space.

REFERENCE SIGNS LIST

1 Video communication system
11 Telecommunication device
21 Frame
22 Display
23 Sensor unit
24 Camera
25-1, 25-2 Sensor
26 Microphone
27-1, 27-2 Speaker
31 Input unit
32 Processing unit
33 Transmission unit
34 Reception unit
35 Output unit
41 Degree-of-interest analysis unit
42 Environmental information analysis unit
43 Indication sound output method selection unit
44 Indication sound control unit
51 Connection destination degree-of-interest analysis unit
71 Secrecy analysis unit
72 Connection destination secrecy acquisition unit
73 Secret sound output method selection unit
74 Secret sound control unit
101 Server
111a, 111b Home server
112a, 112b Input/output unit

The invention claimed is:

1. An information processing device comprising:
a processing unit configured to, when, between a first space where a first imaging device and a first display device are installed and a second space where a second imaging device and a second display device are installed, a captured image captured by the imaging device in one of the spaces is displayed by the display device in the other space in real time, perform processing to notify first users in the first space that second users are outside of an angle of field of the second imaging device when the second users who are at positions outside of the angle of field of the second imaging device are detected,
wherein the performing of the processing includes processing to notify a first specific user who is a specific target among the first users in the first space that second users are outside of an angle of field of the second imaging device by outputting toward the first specific user an indication sound outside of the angle of field of the second imaging device included in sounds collected in the second space, and
wherein the processing unit is implemented via at least one processor.

2. The information processing device according to claim 1,
wherein the processing unit includes
an output control unit configured to output the sounds collected in the second space to a first sound output device installed in the first space in real time, and
an analysis unit configured to analyze the indication sound outside of the angle of field of the second imaging device among the sounds collected in the second space,
wherein the output control unit is further configured to output the indication sound to the first sound output device in real time based on an analysis result of the indication sound, and
wherein the output control unit and the analysis unit are each implemented via at least one processor.

3. The information processing device according to claim 2,
wherein the processing unit further includes an output method selection unit configured to select an output method for the indication sound based on the analysis result of the indication sound,
wherein the output control unit is further configured to cause the first sound output device to output the indication sound using an output method for a selection target, and
wherein the output method selection unit is implemented via at least one processor.

4. The information processing device according to claim 3,
wherein the processing unit further includes a first degree-of-interest analysis unit configured to analyze a degree of interest of a first interested user who is present at the first space and interested in an outside of the angle of field of the second imaging device with respect to the outside of the angle of field of the second imaging device,
wherein the output method selection unit is further configured to select an output method for the indication sound in accordance with the degree of interest of the first interested user, and
wherein the first degree-of-interest analysis unit is implemented via at least one processor.

5. The information processing device according to claim 4, wherein the output control unit is further configured to cause the indication sound to be output to the first interested user among the first users in the first space.

6. The information processing device according to claim 4, wherein the first degree-of-interest analysis unit is further configured to analyze the degree of interest of the first interested user based on a position which is outside of the angle of field of the second imaging device and to which a visual line of the first interested user is oriented, a length of a time in which the visual line of the first interested user is oriented outside of the angle of field of the second imaging device, an orientation of a head of the first interested user, and a sound spoken by the first interested user.

7. The information processing device according to claim 5,
wherein the output method selection unit is further configured to select a method of adjusting and outputting directivity of the indication sound as the output method for the indication sound, and wherein the output control unit is further configured to cause the indication sound of which the directivity is adjusted to be output to the first interested user.

8. The information processing device according to claim 3,
wherein the processing unit further includes a second degree-of-interest analysis unit configured to analyze a degree of interest of the second users at a position outside of the angle of field of the second imaging device in the second space with respect to the first space,
wherein the output control unit is further configured to select an output method for the indication sound in accordance with the degree of interest of a second interested user interested in the first space, and
wherein the second degree-of-interest analysis unit is implemented via at least one processor.

9. The information processing device according to claim 8, wherein the output control unit is further configured to cause the indication sound to be output to a first user of interest in whom the second interested user is interested among the first users in the first space.

10. The information processing device according to claim 9, wherein the second degree-of-interest analysis unit is further configured to analyze the degree of interest of the second interested user based on a position of the first space to which a visual line of the second interested user is oriented, a length of a time in which the visual line of the second interested user is oriented to the first user of interest, a number of times the visual line of the second interested user is oriented to the first user of interest, and an orientation of a head of the second interested user.

11. The information processing device according to claim 9,
wherein the output method selection unit is further configured to select a method of adjusting and outputting directivity of the indication sound as the output method for the indication sound, and
wherein the output control unit is further configured to cause the indication sound of which the directivity is adjusted to be output to the first user of interest.

12. The information processing device according to claim 8, wherein the output control unit is further configured to cause the first sound output device to output a surrounding sound of the second interested user as an indication sound.

13. The information processing device according to claim 8, wherein the output control unit is further configured to cause an illuminant installed in the first space to emit light in accordance with the degree of interest of the second interested user.

14. The information processing device according to claim 8, wherein the output control unit is further configured to cause a device carried by a first user of interest in whom the second interested user is interested to vibrate among the first users in the first space in accordance with the degree of interest of the second interested user.

15. The information processing device according to claim 1,
wherein the processing unit includes
an output control unit configured to cause a first sound output device installed in the first space to output sounds collected in the second space in real time, and
a secrecy acquisition unit configured to acquire secrecy of actions performed by the second users in the second space,
wherein the output control unit is further configured to cause a secret sound to be output to the first users in the first space in accordance with the secrecy, and
wherein the output control unit and the secrecy acquisition unit are each implemented via at least one processor.

16. The information processing device according to claim 1, wherein the processing unit includes
an output control unit configured to cause a first sound output device installed in the first space to output sounds collected in the second space in real time, and
a secrecy analysis unit configured to analyze secrecy of actions performed by the first users in the first space,
wherein the output control unit is further configured to cause an indication sound to be output to the first users in the first space in accordance with the secrecy when the second users are outside of the angle of field of the second imaging device in the second space, and
wherein the output control unit and the secrecy analysis unit are each implemented via at least one processor.

17. The information processing device according to claim 1, wherein the first imaging device and the first display device installed in the first space and the second imaging device and the second display device installed in the second space are integrated and are connected to an information processing device installed in the other space via a network.

18. An information processing method, the method comprising:
when, between a first space where a first imaging device and a first display device are installed and a second space where a second imaging device and a second display device are installed, a captured image captured by the imaging device in one of the spaces is displayed by the display device in the other space in real time,
performing processing to notify first users in the first space that second users are outside of an angle of field of the second imaging device when the second users who are at positions outside of the angle of field of the second imaging device are detected,
wherein the performing of the processing includes processing to notify a first specific user who is a specific target among the first users in the first space that second users are outside of an angle of field of the second imaging device by outputting toward the first specific user an indication sound outside of the angle of field of the second imaging device included in sounds collected in the second space.

19. A non-transitory computer-readable medium having embodied thereon a program, which when executed by a computer causes the computer to execute an information processing method, the method comprising:
when, between a first space where a first imaging device and a first display device are installed and a second space where a second imaging device and a second display device are installed, a captured image captured by the imaging device in one of the spaces is displayed by the display device in the other space in real time,
performing processing to notify first users in the first space that second users are outside of an angle of field of the second imaging device when the second users who are at positions outside of the angle of field of the second imaging device are detected,
wherein the performing of the processing includes processing to notify a first specific user who is a specific target among the first users in the first space that second users are outside of an angle of field of the second imaging device by outputting toward the first specific user an indication sound outside of the angle of field of the second imaging device included in sounds collected in the second space.

* * * * *